US008582890B2

(12) United States Patent
Liba

(10) Patent No.: US 8,582,890 B2
(45) Date of Patent: Nov. 12, 2013

(54) IMAGE SHARPENING VIA GRADIENT ENVIRONMENT DETECTION

(75) Inventor: Orly Liba, Tel Aviv (IL)

(73) Assignee: DigitalOptics Corporation Europe Limited, Ballybrit, Galway (IE)

( * ) Notice: Subject to any disclaimer, the term of this patent is extended or adjusted under 35 U.S.C. 154(b) by 151 days.

(21) Appl. No.: 12/987,759

(22) Filed: Jan. 10, 2011

(65) Prior Publication Data

US 2012/0093431 A1    Apr. 19, 2012

Related U.S. Application Data

(63) Continuation-in-part of application No. 12/905,367, filed on Oct. 15, 2010.

(51) Int. Cl.
*G06K 9/48* (2006.01)
*G06K 9/56* (2006.01)
*G06K 9/40* (2006.01)

(52) U.S. Cl.
USPC ............ 382/199; 382/205; 382/254; 382/261

(58) Field of Classification Search
USPC .............................. 382/260, 263; 348/231.99
See application file for complete search history.

(56) References Cited

U.S. PATENT DOCUMENTS

| | | | |
|---|---|---|---|
| 7,133,044 B2* | 11/2006 | Maillot et al. ................. | 345/423 |
| 2004/0075755 A1 | 4/2004 | Rantanen | |
| 2008/0019606 A1 | 1/2008 | Schoner | |
| 2008/0112649 A1 | 5/2008 | Chen et al. | |
| 2008/0137978 A1* | 6/2008 | Fu ................................. | 382/255 |
| 2011/0123121 A1* | 5/2011 | Springer et al. .............. | 382/199 |
| 2012/0076420 A1* | 3/2012 | Kono et al. ................... | 382/199 |
| 2012/0093419 A1* | 4/2012 | Liba et al. ..................... | 382/197 |
| 2012/0093431 A1 | 4/2012 | Liba | |

FOREIGN PATENT DOCUMENTS

EP    1 480 166 A1    11/2004

OTHER PUBLICATIONS

Malik et al, Contour and Texture Analysis for Image Segmentation, Jun. 2001, International Journal of Computer Vision, vol. 43, pp. 1-21.*
Trenev, Math 131 Lecture Notes—Texas A&M University, Aug. 2008 (See p. 10 for proof of the internet publication date of the Trenev reference—shows web directory listing with date.), pp. 1-10.*
International Search Report received in PCT Application No. PCT/EP11/067943 dated Jan. 13, 2012 (5 pages).

(Continued)

*Primary Examiner* — Utpal Shah
(74) *Attorney, Agent, or Firm* — Hickman Palermo Truong Becker Bingham Wong LLP

(57) ABSTRACT

In an embodiment, a device comprises a plurality of elements, including logical elements, wherein the elements are configured to perform the operations of: in a neighborhood of pixels surrounding and including a particular pixel, applying a filter to multiple groups of pixels in the neighborhood to generate a set of filtered values; generating, based at least in part upon the set of filtered values, one or more sets of gradient values; based at least in part upon the one or more sets of gradient values, computing a first metric for an image environment in which the particular pixel is situated; determining a second metric for the image environment in which the particular pixel is situated, wherein the second metric distinguishes between a detail environment; and based at least in part upon the first metric and the second metric, computing a gradient improvement (GI) metric for the particular pixel.

16 Claims, 20 Drawing Sheets

(56) References Cited

OTHER PUBLICATIONS

Current Claims, PCT Application No. PCT/EP11/067943 (7 pages).
Written Opinion of ISA received in PCT Application No. PCT/EP11/067943 dated Jan. 13, 2012 (10 pages).
Shujun Fu et al.: "Region-Based Shock-Diffusion Equation for Adaptive Image Enhancement" dated Jan. 1, 2006, Advances in Machine Vision, Image Processing and Pattern Analysis Lecture Notes in Computer Science; LNSC, Springer, Berlin, DE, 9 pages.
International Search Report received in PCT Application No. PCT/EP11/67942 dated Jan. 13, 2012 (4 pages).
Written Opinion of ISA received in PCT Application No. PCT/EP11/67942 dated Jan. 13, 2012 (8 pages).
Current Claims, PCT Application No. PCT/EP11/67942 (6 pages).
U.S. Appl. No. 12/905,367, filed Oct. 15, 2010, Office Action, Jul. 2, 2012.
Malik et al., Contour and Texture for Image Segmentation, dated Jun. 2001, International Journal of Computer Vision, vol. 43, 21 pages.
Sonka et al., Chapter 14 Image Processing, Analysis and Machine Vision; Dated 1999, PWS Publishing; $2^{nd}$ ed; 2 pages.
U.S. Appl. No. 12/905,367, filed Feb. 12, 2013, Final Office Action, Dec. 12, 2012.
U.S. Appl. No. 12/905,367, filed Feb. 12, 2013, Advisory Action, Feb. 25, 2013.
U.S. Appl. No. 12/905,367, filed Feb. 12, 2013, Interview Summary, Feb. 8, 2013.

\* cited by examiner

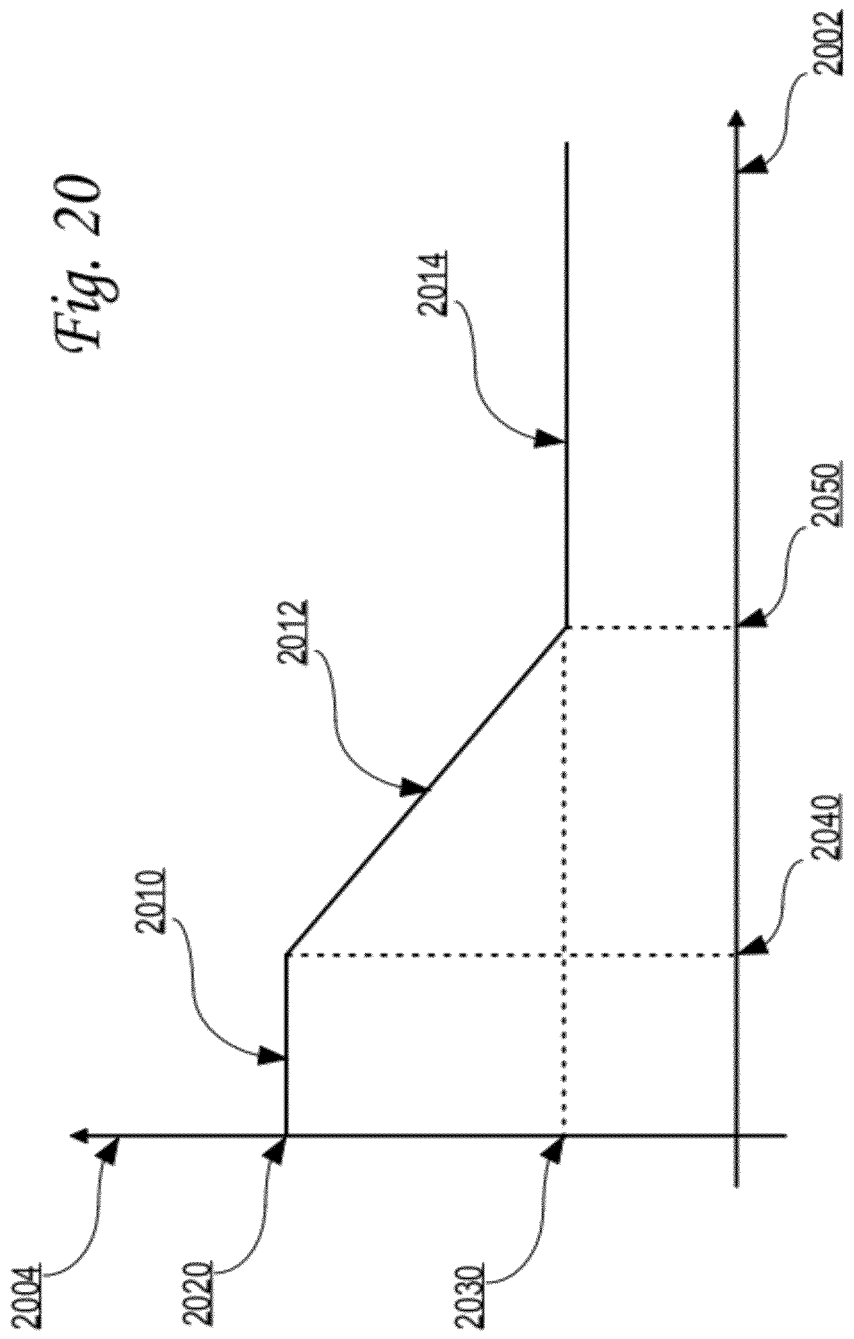

IMAGE SHARPENING VIA GRADIENT ENVIRONMENT DETECTION

PRIORITY CLAIM

Cross Reference to Related Application

This application claims domestic priority under 35 U.S.C. 120 as a Continuation-in-part of prior application Ser. No. 12/905,367 filed Oct. 15, 2010, the entire contents of which is hereby incorporated by reference as if fully set forth herein.

BACKGROUND

Color images may be captured and reproduced by a variety of digital devices, such as digital cameras and digital recorders. In capturing an image, to collect raw information representing the image, a digital device may use various optical lenses, sensors and filters. However, due to a range of factors, such as physical limitations of the optical lenses and sensors, a raw image captured by a digital device often suffers from problems such as chromatic aberration, lack of clarity, insufficient contrast in fine detail areas, inadequate sharpness, etc. To correct the problems, the captured image is often digitally processed. After the raw image data is processed, the resulting image is rendered and delivered to a user.

Techniques for digital processing of the captured images allow for reducing the image distortion, enhancing image contrast and sharpness, enhancing detail definition in fine detail areas, etc. One of the techniques often applied to raw image data is image sharpening. Sharpening is typically used to enhance sharpness and contrast in various portions of an image.

However, one of the problems with the current sharpening techniques is that the techniques have a tendency to produce image artifacts, such as over-sharpening of edge-areas and introducing noise in fine-detail areas. For example, sharpening of some images may cause the appearance of the edges to be over-exaggerated and the details in the fine-detail areas to be deemphasized, unclear or fuzzy. For instance, while processing an image of a parcel box, the current sharpening techniques often exaggerate an appearance of the edges of the parcel box, but deemphasize the details of the fine print depicted on the parcel's label. The resulting image may look unacceptable because it may be difficult to read the fine print on the parcel's label. Thus, in general, the current image processing techniques, including the current sharpening techniques, fail to provide results that are wholly satisfactory.

BRIEF DESCRIPTION OF THE DRAWINGS

In the drawings:

FIG. 20 depicts correlation between a gradient difference final value and an edge-gradient indicator.

DETAILED DESCRIPTION

Figure 1:
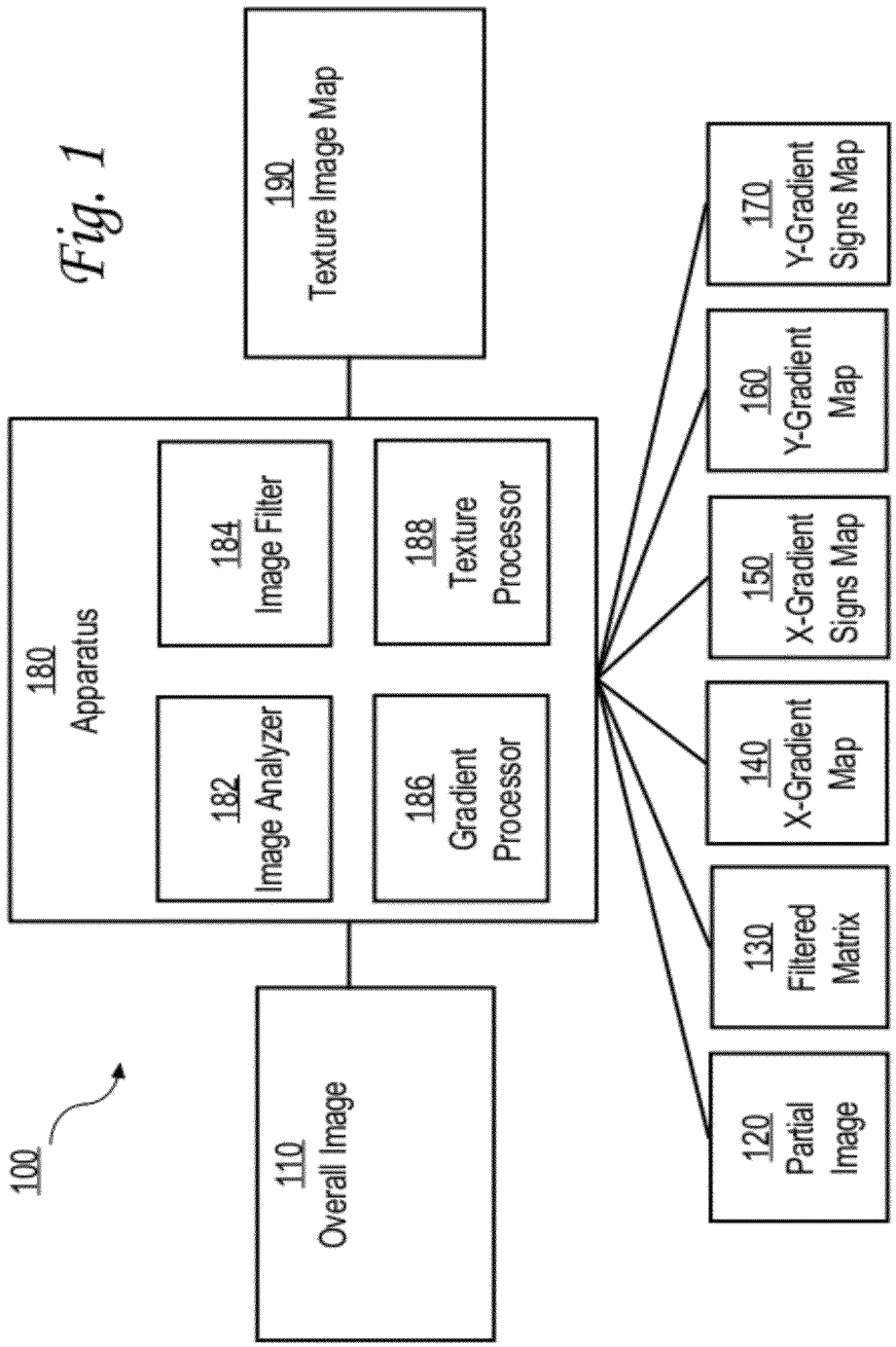
FIG. 1 depicts an example of a system in which an embodiment of the invention may be implemented.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 GENERAL OVERVIEW

One of the reasons that current image processing techniques do not provide wholly satisfactory results is that they are unable to accurately determine the type of image environment in which one or more pixels are located. For example, if a sharpening technique were aware that a particular pixel is situated in an edge area, then the technique may reduce the sharpening effect to avoid over sharpening the pixel, thereby preventing the edge from appearing as over-exaggerated. Similarly, if the sharpening technique were aware that a particular pixel is in a fine-detail area, then it may increase the sharpening effect to significantly sharpen the pixel, thereby emphasizing the fine detail. Thus, if the image processing techniques were provided with more accurate information regarding the image environment in which pixels are located, then they may be able to produce better results.

Thus, in accordance with one embodiment of the present invention, a technique is provided for assigning a texture characterization value (also referred to herein as a texture value) to a pixel of a captured image. The texture value indicates the type of image environment in which the pixel is located. Given this texture information, many processing techniques will be able to produce better results.

In an embodiment, the image environments range in a substantially continuous spectrum from a "flat area" to a "detail area" to an "edge area." A flat image environment is one in which the characteristics of the pixels around a pixel of interest change rather frequently (chaotically). An edge environment is one in which the pixels around the pixel of interest have characteristics that are consistent (monotonic) (e.g. an area of the image in which there is a change from one object, such as a parcel box, to another object, such as a table, on which the parcel box is placed). A detail image environment is one in which the pixels around the pixel of interest have rather dissimilar characteristics, indicating numerous (chaotic) changes if the area contains fine details (e.g. an area of an image with fine print) and/or indicating consistent (monotonic) characteristics if the area depicts some edges.

Pixels in a captured image are assigned associated texture values. A texture value for a particular pixel indicates whether the pixel is located in a flat-environment, a detail-environment, an edge environment, or somewhere in between. The texture value information can be used advantageously by an image processing technique to process raw data of the captured image to produce an image in which the appearance of the edges is not exaggerated and the details in the fine-detail areas do not appear unclear or fuzzy.

In an embodiment, the technique for assigning a texture value to a pixel is applied to a vast majority (or even all) if so desired) of the pixels of a captured image. The texture values are computed for the majority (or all) of the pixels of the captured image from the pixel information included in the captured image data. The texture values are stored in a Texture Image Map, also referred to as an edge/detail map. The Texture Image Map contains a texture value for most (or all) of the pixels of the captured image, and may be used by various image processing techniques to further enhance the quality of the captured image.

In an embodiment, derivation of texture values for the Texture Image Map involves computing each texture value one at a time. Each texture value corresponds to one of the pixels in an overall input image (e.g. the captured image). To compute a texture value for a particular pixel in the overall image, a part of the overall image, referred to as a partial image, is processed. In an embodiment, the partial image corresponding to a particular pixel is defined as an "n-by-n" square pixel array, where "n" is an integer and "n-by-n" indicates a dimension of the square pixel array. The "n-by-n" square pixel array is a neighborhood of pixels surrounding a particular pixel in the overall image. In an alternative embodiment, the partial image corresponding to the particular pixel may be defined as an "n-by-m" rectangular pixel array, where "n" and "m" are integers and "n" is not equal to "m," and where the "n-by-m" is a neighborhood of pixels surrounding the particular pixel in the overall image.

Figure 2:
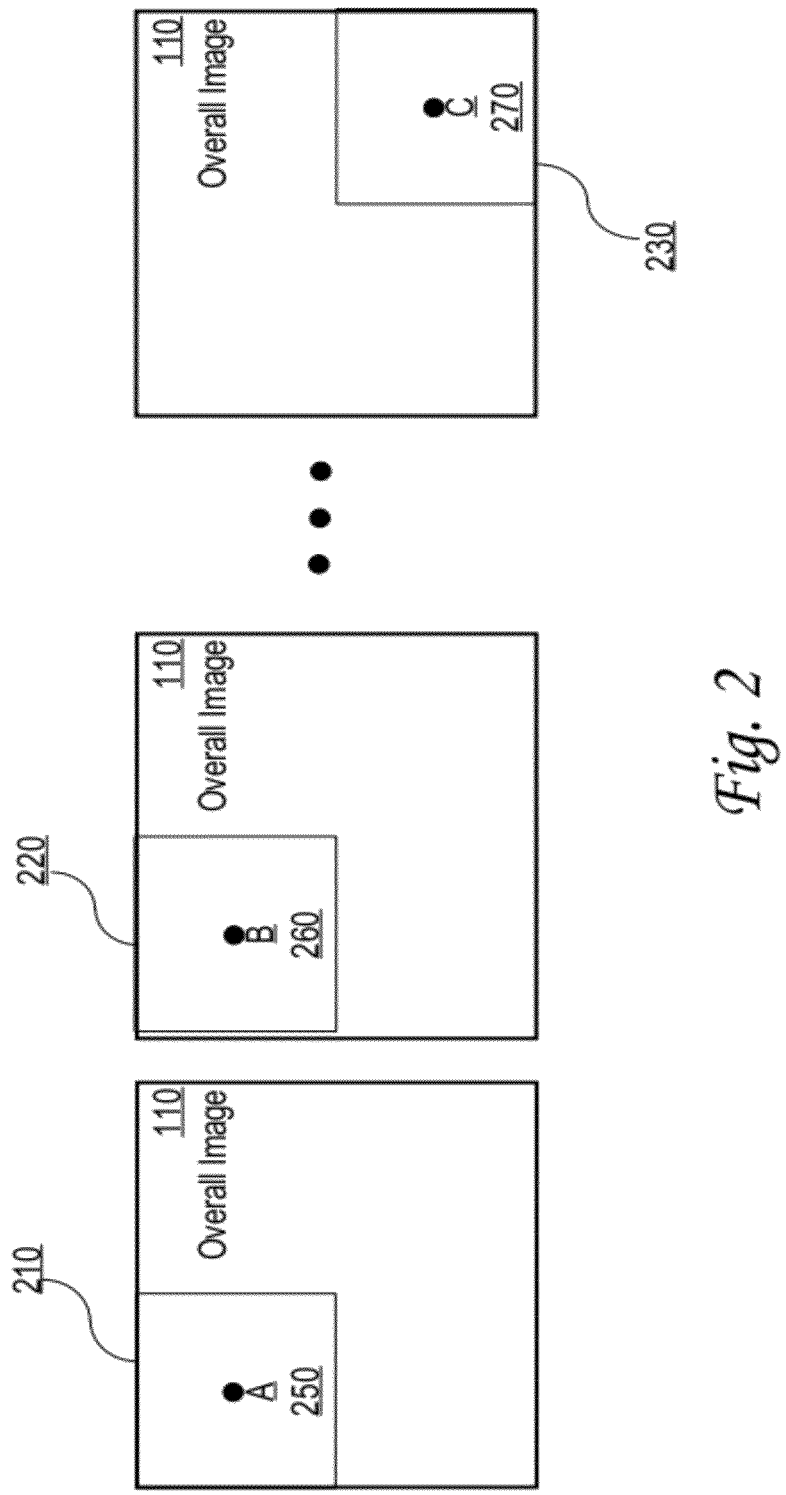
FIG. 2 depicts a correlation between a pixel and its corresponding Partial Image, in accordance with an embodiment of the invention.

FIG. 2 depicts a correlation between a pixel and its corresponding partial image, in accordance with an embodiment of the invention. FIG. 2 shows an overall image 110, and a plurality of partial images within the overall image 110, including a first partial image 210, a second partial image 220, and a last partial image 230. The first partial image 210 has a center pixel A 250. The second partial image 220 has a center pixel B 260. Pixel B 260 is just one pixel to the right of pixel A 250, and the second partial image 220 is shifted one pixel to the right of the first partial image 210. The last partial image 230 has a center pixel C 270.

In accordance with one embodiment of the present invention, a texture value is computed for pixel A 250 by processing the pixels that are in the first partial image 210. By shifting a focus from the first partial image 210 to the second partial image 220, another center pixel (pixel B) and its corresponding partial image can be derived. A texture value for pixel B 260 is computed by processing the pixels that are in the second partial image 220. By shifting the focus from the second partial image 220 to the next partial image, another center pixel and its corresponding partial image can be derived. A texture value for that center pixel is computed by processing the pixels in its corresponding partial image. This process continues until all of the partial images in that row have been processed. Then, the focus shifts down to the next row of pixels, and the texture values for center pixels in that row are computed until all of the partial images in that row have been processed. The process of shifting the focus to the right and down continues until the last partial image 230, having a center pixel C 270, is processed. After the last partial image 230 is processed, a texture value is computed for each of the center pixels of each of the partial images.

Figure 16:
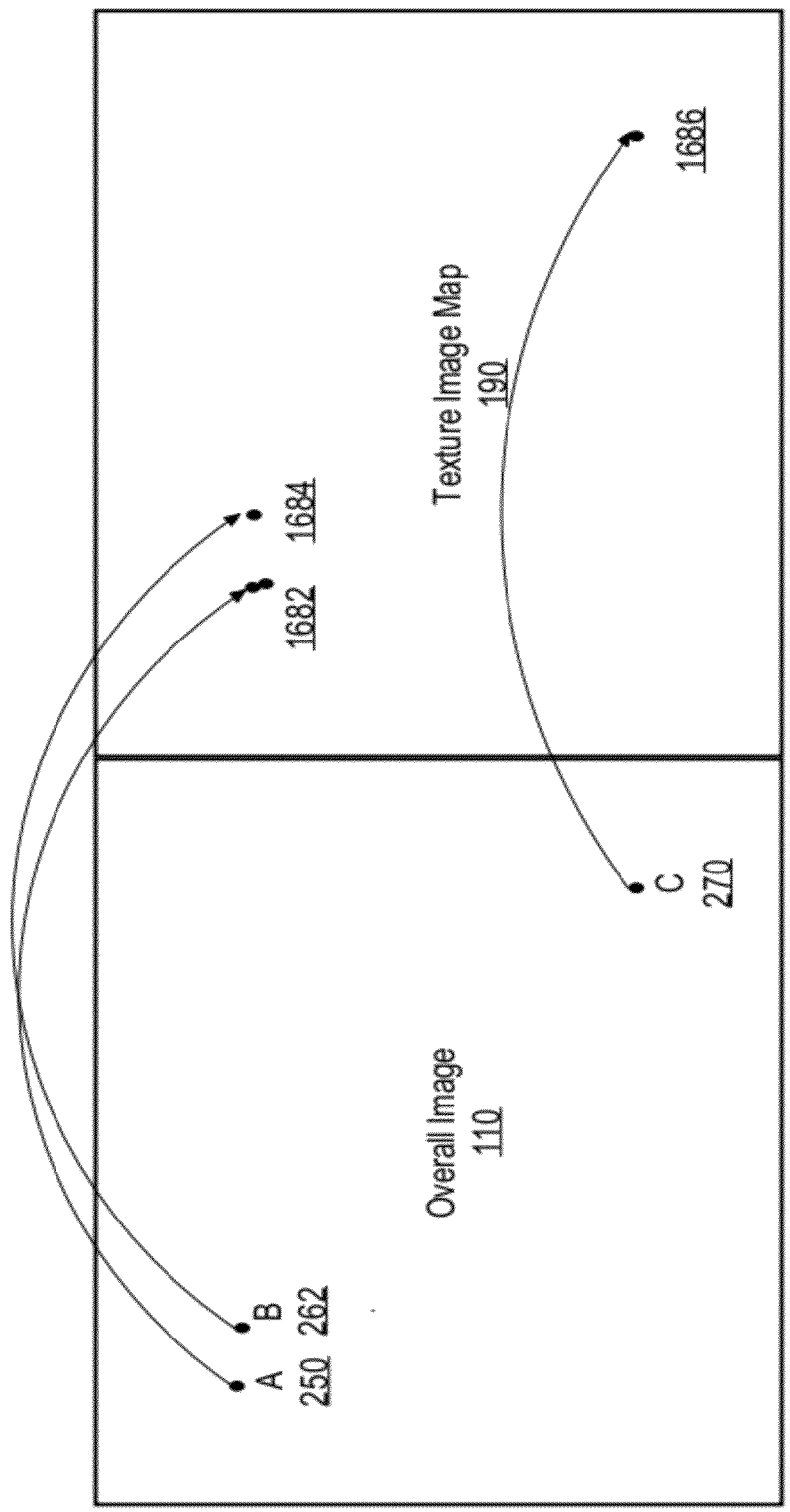
FIG. 16 depicts a correlation between the pixels in an Overall Image and the texture values in a corresponding Texture Image Map, in accordance with an embodiment of the invention.

FIG. 16 shows a correlation between the pixels in the overall image 110 and the texture values in a corresponding Texture Image Map 190, in accordance with one embodiment of the present invention. As shown, the texture value for pixel A 250, which is located in a first partial image, is stored as a texture value for a center pixel A 1682 in the Texture Image Map 190, and corresponds to the location of pixel A 250 in the overall image 110. Similarly, the texture value for pixel B 262, which is located in a second partial image in the first raw, is stored as a texture value for a center pixel B 1684 in the Texture Image Map 190. Furthermore, the texture value for pixel C 270, which is located in a last partial image, is stored as a texture value for a center pixel C 1686 in the Texture Image Map 190, and corresponds to the location of pixel C 270 in the overall image 110.

In an embodiment, no texture values are computed or stored for some of the topmost and bottommost rows of pixels in the overall image 110, and for some of the leftmost and rightmost columns of pixels of the overall image 110. However, if so desired, texture values may be computed and stored for all pixels of the overall image 110, including the pixels in the topmost, bottommost, leftmost and rightmost edges of the overall image 110.

In an embodiment, to derive a texture value for a particular pixel, the partial image corresponding to that particular pixel is determined. A filter is then applied to a plurality of clusters (or groups) of pixels of that particular partial image. Systematic application of this filter to various clusters generates a filtered matrix for the particular partial image. For example, upon applying the filter to a first cluster of pixels in the partial image, a first value for the filtered matrix is generated. Upon applying the filter to a second cluster in the partial image, a second value for the filtered matrix is generated, and so forth, until, upon applying the filter to the last cluster of the partial image, the last value for the filtered matrix is generated.

In an embodiment, each value in the filtered matrix represents an overall "chrominance" value for the cluster of pixels corresponding to that filtered matrix value. In another embodiment, each value in the filtered matrix represents an overall "luminance" value for the cluster of pixels corresponding to that filtered matrix value. In other embodiment, each value in the filtered matrix represents an overall combined "chrominance" and "luminance" value for the cluster of pixels corresponding to that filtered matrix value.

In an embodiment, from the filtered matrix, a first set of gradients along a first direction is computed and stored in an X-Gradients map.

In an embodiment, from the X-Gradients map, a set of gradient signs is determined and stored in an X-Gradient Signs map.

In an embodiment, from the filtered matrix, a second set of gradients along a second direction is computed and stored in a Y-Gradients map. The second direction is different from the first direction. For example, the second direction may be perpendicular to the first direction. For instance, if the first direction is the horizontal direction, then the second direction may be the vertical direction.

In an embodiment, from the Y-Gradients map, a set of gradient signs is determined and stored in a Y-Gradient Signs map.

In an embodiment, from the Gradient maps and Gradient Signs maps, a quantity of gradient sign changes in the first direction is computed and a quantity of gradient changes in the second direction are computed. Based, at least in part, upon the magnitudes of the gradients and the quantity of the gradient sign changes in the respective directions, a first value and a second value are computed.

In an embodiment, based at least in part on the first value and the second value, weights in the first and second directions are computed. Then, using the weights and the first and second values, a SUMX in the first direction and a SUMY in the second direction are computed.

In an embodiment, based, at least in part upon the SUMX and SUMY, a texture value for the particular pixel is computed. The computed texture value is computed for one pixel of the overall image at the time. The computed texture value indicates the texture of the environment surrounding the particular pixel for which the texture value was computed. The computed texture value for the particular pixel of the overall image 110 is stored in the Texture Image Map 190 at a location in the Texture Image Map 190 that corresponds to the location of the particular pixel in the overall image 110.

The above process is repeated for each partial image corresponding to each particular pixel in the overall image for which a texture value is to be computed. At the end of the process, the Texture Image Map 190 will contain texture values for all of the pixels of the overall image for which a texture value is to be computed. The Texture Image Map 190 for the overall image is thus derived. The Texture Image Map 190 may thereafter be used in further processing of the overall image to enhance the image prior to presentation to a user.

2.0 STRUCTURAL AND FUNCTIONAL OVERVIEW OF AN APPARATUS

Figure 15:
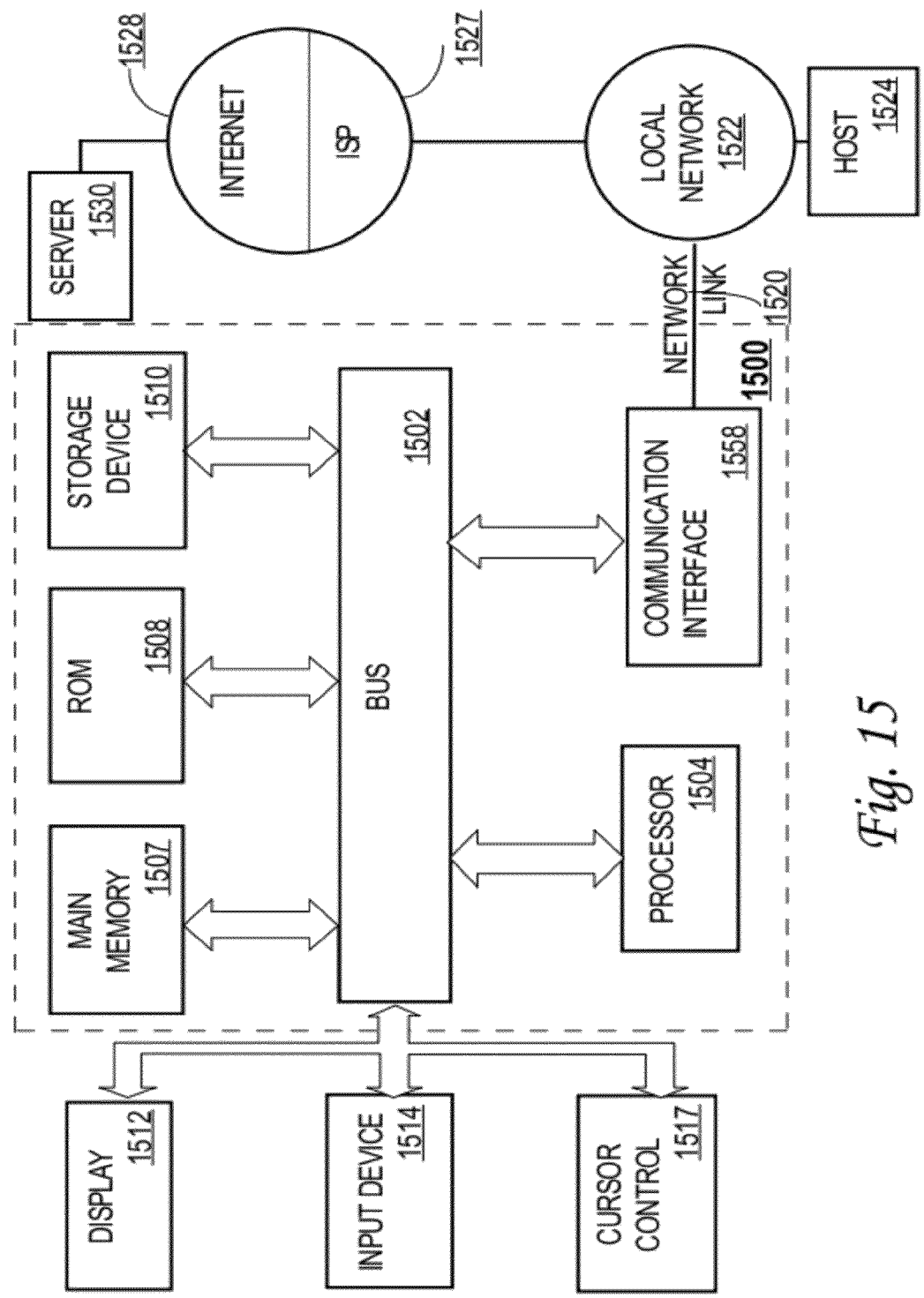
FIG. 15 depicts a block diagram of a computing device upon which an embodiment of the present invention may be implemented.

FIG. 1 depicts an example of a system 100 in which an embodiment of the invention may be implemented, and FIG. 15 depicts a block diagram of a computing device upon which an embodiment of the present invention may be implemented.

Referring first to FIG. 1, in an embodiment, a system 100 comprises an apparatus 180. The apparatus 180 selects a partial image 120 from an overall image 110, processes the partial image 120, and generates and outputs one value at a time for a Texture Image Map 190. For each of the partial images 120, apparatus 180 generates a filtered matrix 130, an X-Gradient map 140, an X-Gradient Signs map 150, a Y-Gradient map 160, and a Y-Gradient Signs map 170, each of which is described in detail below.

For purposes of the present invention, the apparatus 180 may be implemented using any known technology. For example, the apparatus 180 may be hardware implemented using a device (e.g. a programmable logic array) having an array of logical elements wherein the logical elements are programmed/configured to implement the technique described herein. As an alternative, the apparatus 180 may be hardware implemented by way of another device such as an application specific integrated circuit (ASIC) having logical elements that are constructed/configured to implement the technique described herein. As a further alternative, the apparatus 180 may be software implemented such that the technique described herein is set forth in a set of instructions that are stored in a machine readable storage medium and executed by one or more computing devices (such as the sample computer system shown in FIG. 15) to carry out the technique described herein. These and other implementations are possible. All possible implementations are within the scope of the present invention.

From a functional standpoint, the apparatus 180 comprises an image analyzer module 182, an image filter module 184, a gradient processor module 186 and a texture processor module 188. These modules interact with each other to carry out the technique described herein.

2.1 Image Analyzer

In an embodiment, an image analyzer 182 receives an overall image 110. The overall image 110 may be captured using any of the image capturing techniques, including a mosaicing approach for image capturing that uses a color filter array (CFA) and an array of optical sensors that is overlaid by the CFA. The CFA has a plurality of filter elements, each of which overlays one of the optical sensors in the optical sensor array, and each of which is designed to pass only one color of light.

The most common type of CFA is a Bayer pattern filter, also referred to as a Bayer filter. The Bayer filter comprises filter elements, each of which passes one of the three different colors of light: green (G), blue (B), and red (R). The filter elements are arranged in alternating rows of green-blue and red-green. With this pattern, red and blue filter elements appear on every other row and every other column, while green filter elements appear on every row and every column. Such a pattern corresponds to the human eye's sensitivity, which is stronger to the green light component and weaker to the red and blue light components. provides information on only one of the three colors.

In an embodiment, an overall image is a Bayer image captured using a Bayer Filter. Details of the Bayer filter are described, for example, in U.S. Pat. No. 3,971,065.

In an embodiment, each value in the overall image 110 is provided by one of the optical sensors, and each value corresponds to a particular color value (red, green or blue) of a particular pixel of the image.

In an embodiment, the image analyzer 182 selects a portion of the overall image 110 and processes one selected portion of the image at a time. The first selected portion of the overall image 110 may be referred to as a first partial image. The second selected portion may be referred to as a second partial image, and so forth. The last selected portion may be referred as a last partial image.

2.2 Image Filter

In an embodiment, an image filter 184 processes a partial image 120 to produce a filtered matrix 130. A filtered matrix 130 is a matrix that contains values computed from the pixel information stored for the pixels in the partial image 120 by applying for example a low pass filter to the pixel information.

In an embodiment, a partial image 120 is provided as a Bayer window. The image filter 184 processes the partial image 120 (e.g., the Bayer window data) starting from selecting a group of pixels in the upper left corner of the partial image 120.

In an embodiment, the values in the selected group of pixels are multiplied by a filter, also referred as a "Y" filter, that has a low pass quality and is designed in such a way that the pixel information of the central pixel of the selected group of pixels is emphasized the most, while the pixel information of the corner pixels of the selected group of pixels is deemphasized in computing a value for the filtered matrix 130. Applying the "Y" filter allows balancing the red, green and blue color components of the partial image 120.

In an embodiment, the process of computing values for the filtered matrix 130 is repeated for each group of pixels in the partial image 120, until the last value of the filtered matrix 130 is computed. The details of computing values for the filtered matrix 130 are provided below with reference to FIG. 3-5.

In an embodiment, the resulting filtered matrix 130 is referred to as a "Y" window. Values stored in the filtered matrix contain distinctive values that characterize, for example, color and color intensity for the clusters of pixels in the partial image 120.

2.3 Gradient Processor

In an embodiment, using the values stored in the filtered matrix 130, a gradient processor 186 computes gradient maps and gradient signs maps.

The purpose of computing gradients is to obtain a measure of the changes in the image characteristics for the clusters of pixels. For example, if a cluster of pixels in the partial image depicts an edge or a shadow of some object, then the gradients may be monotonic since there may be a relatively small number of directional changes in the gradient values. If a cluster of pixels in a partial image depicts a flat area or a detail area, then the gradients for such an area might be chaotic since there may be a relatively large number of directional changes in the gradient values. The gradients may be pointing to various directions because in those areas the color and color intensity change frequently an and in many directions even for a relatively small cluster of pixels.

In an embodiment, using the information stored in a filtered matrix 130, the gradient processor 186 computes the gradients for two separate directions. For example, the gradient processor 186 may compute the gradients in the horizontal direction, and then compute the gradients in the vertical direction. The gradients computed in the horizontal direction may be stored in an X-Gradient Map 140, and the gradients computed in the vertical direction may be stored in a Y-Gradient Map 150. The details about computing the gradients in the X-direction are provided below with reference to FIG. 6-7. The details about computing the gradients in the Y-direction are provided below in reference to FIG. 8

In an embodiment, using the information stored in an X-Gradient Map 140, the gradient processor 186 determines the signs of the gradients, and stores the sign information in an X-Gradient Signs Map 150. According to one approach, for each value in the X-Gradient Map 140, a sign value is determined and stored in an X-Gradient Signs Map 150. If a particular value in the X-Gradient Map is less than "0," then the respective particular value in the X-Gradient Signs Map is "−1." If a particular value in the X-Gradient Map is greater than "0," then the respective particular value in the X-Gradient Signs Map is "1." If the value in the X-Gradient Map is "0," then the respective particular value in the X-Gradient Signs Map is "0." The details of determining sign changes are provided below with reference to FIG. 9.

The gradient processor 186 also determines the signs of the gradients in the Y-Gradient Map. According to one approach, using the information stored in the Y-Gradient Map 160, the gradient processor 186 determines the signs of the gradients, and stores the sign information in a Y-gradient Signs Map 170. If a particular value in the Y-Gradient Map is less than "0," then the respective particular value in the Y-Gradient Signs Map is "−1." If a particular value in the Y-Gradient Map is greater than "0," then the respective particular value in the Y-Gradient Signs Map is "1." If the value in the Y-Gradient Map is "0," then the respective particular value in the Y-Gradient Signs Map is "0."

In an embodiment, the gradient processor 186 also determines how many times the signs of the gradients change in an X-Gradient Signs map 150 and how many times the signs of the gradient change in a Y-Gradient Signs Map 170.

2.4 Texture Processor

In an embodiment, a texture processor 188 computes the texture values that populate the Texture Image Map 190. A Texture Image Map 190 is also referred to as an edge/detail map. Each particular texture value in the Texture Image Map 190 indicates the type of environment that surrounds a particular pixel in an overall image 110 for which the particular texture value was computed. Values stored in the Texture Image Map 190 may be used by image processing techniques to enhance the overall image.

The Texture Image Map 190 may be applied to an image for a variety of purposes. For example, an application of the Texture Image Map 190 to an image may allow producing a digital image in which the details appear sufficiently sharp and clear while the edges of the objects depicted in the resulting image are not excessively exaggerated. The Texture Image Map 190 is computed and applied to an overall image to enhance the details depicted in the image while decreasing the sharpening and chromatic aberration correction for the areas of the image that correspond to the edges of the objects depicted in the image. According to another example, the Texture Image Map 190 may be used to create an opposite effect, such as sharpening of the appearance of the edges and toning down the appearance of the details. This may be useful in for example machine-vision applications.

The texture image processor 188 computes a value for the Texture Image Map 190 by using the information stored in an X-Gradient Map 140, an X-Gradient Signs Map 150, a Y-Gradient Map 160 and a Y-Gradient Signs Map 170. Using the information stored in the above listed maps, the texture image processor 188 computes weights indicating the sign changes in each of the X and Y directions, weighs the respective sums of gradient changes in each of the X and Y directions and combines the weighted sums of the gradient sign changes to generate one value for the Texture Image Map 190 for a respective particular pixel. The process is repeated for a vast majority (or all) of pixels in the overall image 110.

For a particular pixel of an overall image 110, the Texture Image Map 190 stores one texture value. The texture value quantifies the type of the texture environment for the particular pixel. For example, for the particular pixel, a corresponding value in the Texture Image Map 190 may represent an intensity adjustment that should be applied to the pixel' information for the particular pixel stored in the overall image 110.

In an embodiment, data stored in the Texture Image Map 190 is used in processing raw information stored in an overall image 110. For example, upon applying the intensity adjustment to the pixel information stored in the overall image 110 for the respective pixels, the color values in a resulting image are adjusted in such a way that the edges depicted in the resulting image should not appear exaggerated and the details depicted in the resulting image should not appear unclear.

Depending on implementation, the Texture Image Map 190 may be a matrix that is smaller in size than the overall image 110. For example, the Texture Image Map 190 may contain texture values for the pixels located at a central portion of the overall image, but may be lacking texture values for the pixels located along a border of the overall image. The pixels located along the border of the overall image 110 may lack a sufficient number of surrounding pixels. Therefore, for the pixels that are not completely surrounded by other pixels and de hence do not have sufficient neighboring pixels, the texture processor in one embodiment does not compute the texture values.

3.0 PROCESS OF COMPUTING TEXTURE VALUES

Figure 10:
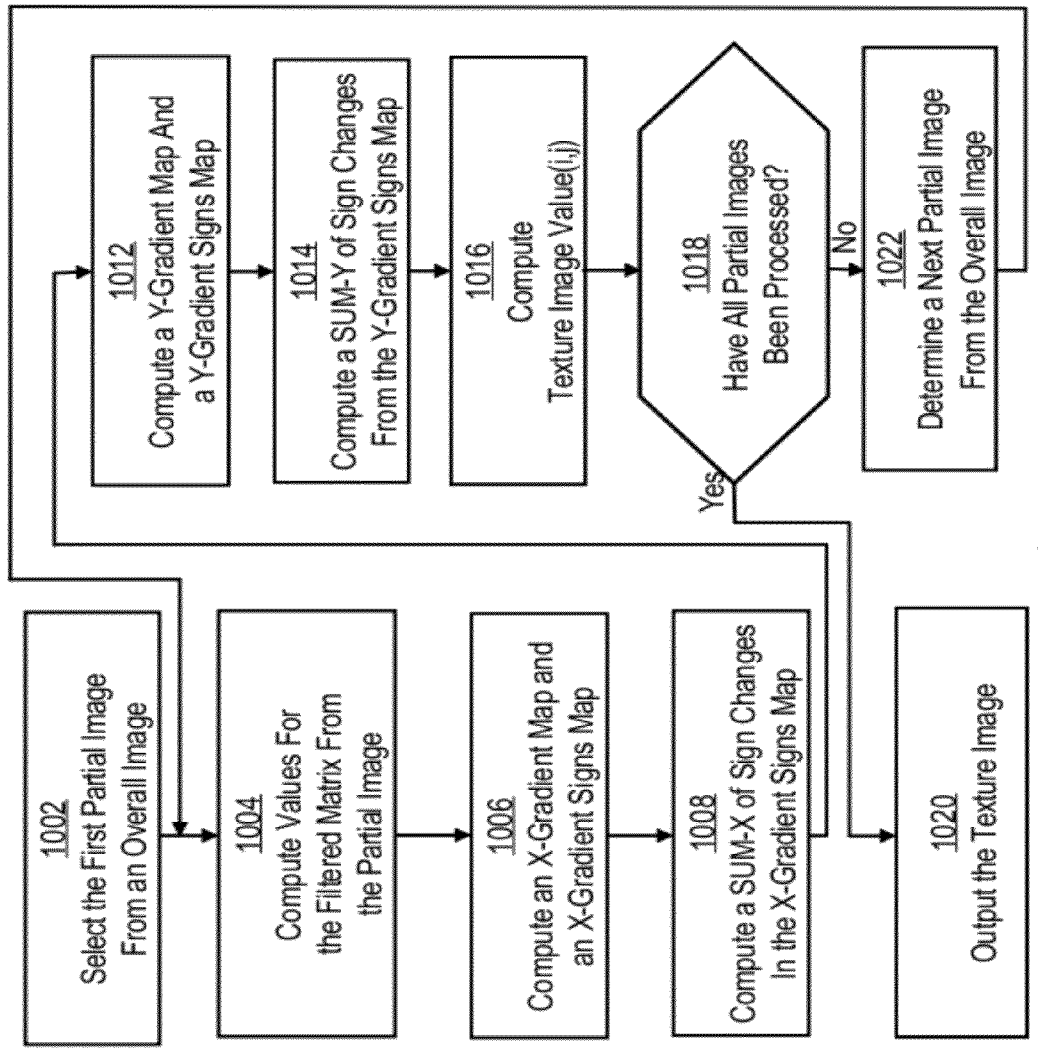
FIG. 10 depicts an example of technique for computing a Texture Image Map, in accordance with an embodiment of the invention.

FIG. 10 depicts an example of a technique for computing the texture values in a Texture Image Map 190, in accordance with an embodiment of the invention. Each value in the Texture Image Map 190 is computed based, at least in part, on information stored in a partial image 120, a Filtered Matrix 130, an X-Gradient Map 140, a Y-Gradient Map 160, an X-Gradient Signs Map 150 and a Y-Gradient Signs Map 170.

Figure 18:
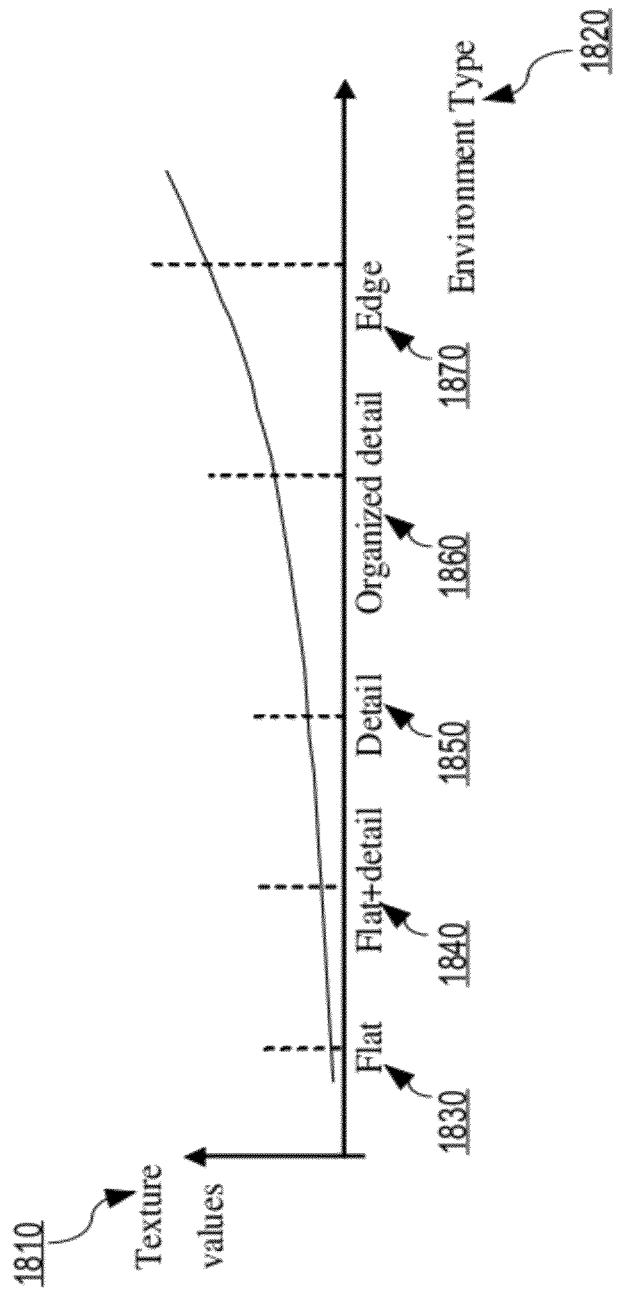
FIG. 18 depicts correlation between texture values and environment types, in accordance with an embodiment of the invention.

In an embodiment, the Texture Image Map 190 represents values that allow distinguishing between various types of environment depicted in an overall image 110. For example, the Texture Image Map 190 comprises values that allow for differentiating the flat areas, from the flat+detail areas, from the detail areas, from organized detail+edge areas, and finally from the areas with edges. FIG. 18 depicts correlation between texture values and environment types, in accordance with en embodiment of the invention. As depicted in FIG. 18, the texture values 1810, stored in the Texture Image Map 190, may be proportional to the values that correspond to the characteristics of the environments 1820, such as a flat 1830, a flat+detail 1840, a detail 1850, an organized detail 1860, and an edge 1870. For example, the texture values for pixels that belong to a rather flat area 1830 of an overall image may be smaller than the texture values for the pixels that belong to an area of the overall image that depicts an edge, 1870 as it is illustrated in FIG. 18.

Referring again to FIG. 10, in step 1002, a first partial image 120 from an overall image 110 is selected. In an embodiment, selection of the partial image 120 is performed by an image analyzer, which is depicted in FIG. 1.

As described before, FIG. 2 depicts an example of technique for selecting a partial image from an overall image 110. A partial image is a segment or a part of the overall image 110. The partial image may be a rectangular array of the pixels surrounding a particular pixel for which a texture value is to be computed.

In FIG. 2, an overall image 110 contains a first partial image 210. The first partial image 210 is selected by overlaying a rectangular window over a group of pixels located at the upper left corner of the overall image and storing pixel information about the pixels that are enclosed by the rectangular window.

In FIG. 2, an overall image 110 also contains a second partial image 220. The second partial image 220 is selected by shifting the rectangular window to the right from the first position by one column horizontally and storing pixel information about the pixels that are enclosed by the rectangular window.

The process of selecting a third partial image is performed by shifting the rectangular window from the second position to the right by one column of pixels horizontally. The process is repeated until the right edge of the overall image 110 in a given row is reached. Upon reaching the right edge of the overall image, the rectangular window may be moved back to the upper left corner of the overall image and then shifted from that position down by one row of pixels vertically.

The process of selecting a partial image may be repeated until the last possible partial image is selected. For example, a last partial image 230 may be selected by overlaying the rectangular window over a group of pixels located at the lower right corner of the overall image and capturing information about the pixels that are enclosed by the rectangular window.

Referring again to FIG. 10, after a partial image is selected, in step 1004, values for a filtered matrix 130 are computed from the partial image 120 are computed. In an embodiment, the values for the filtered matrix 130 are computed by an image filter 130, which is depicted in FIG. 1. Examples of computing the values for the filtered matrix 130 are described in detail with reference to FIGS. 3-5.

Figure 3:
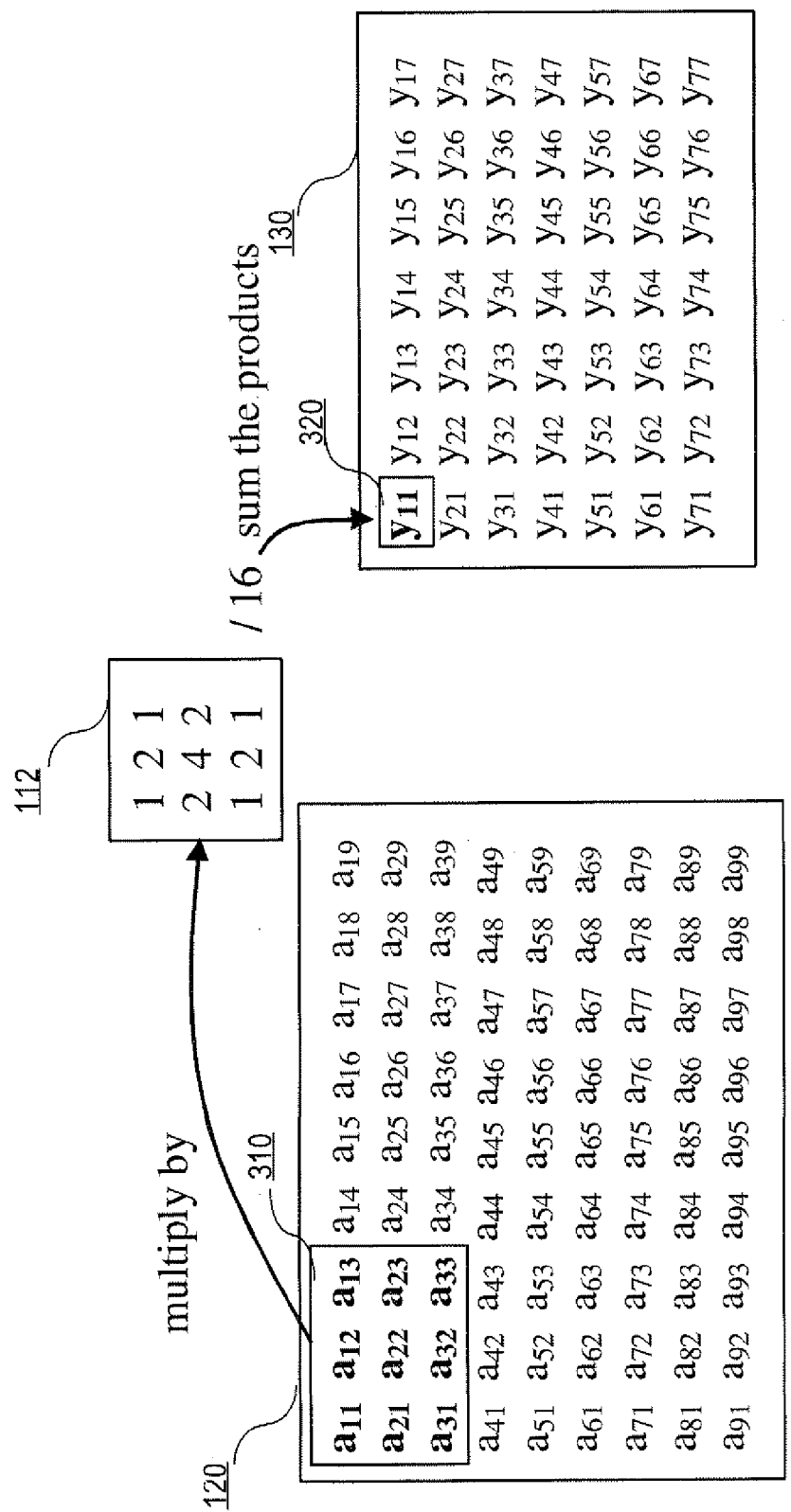
FIG. 3 depicts an example of technique for computing values for a Filtered Matrix from a Partial Image, in accordance with an embodiment of the invention.
Figure 4:
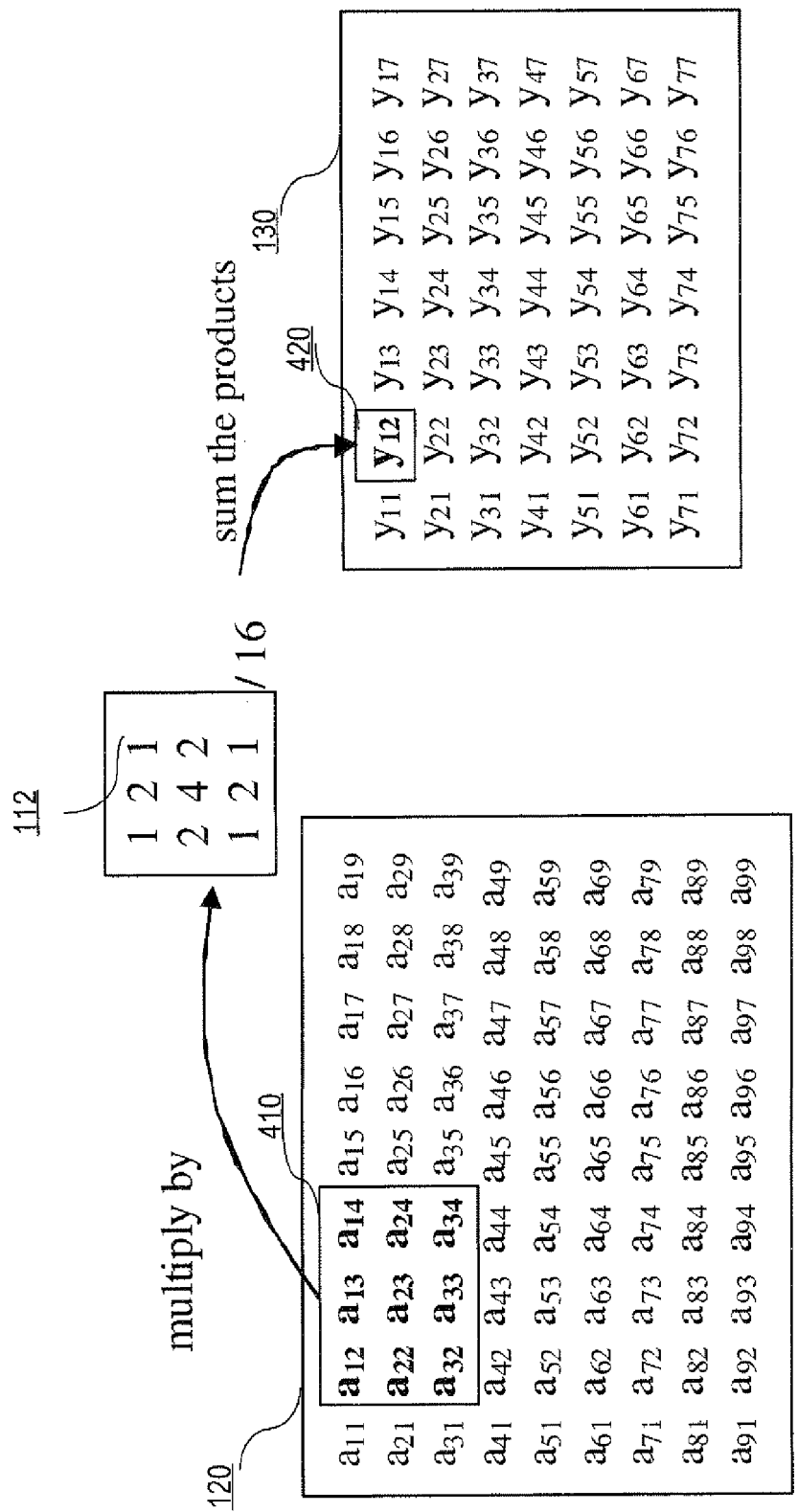
FIG. 4 depicts an example of technique for computing values for a Filtered Matrix from a Partial Image, in accordance with an embodiment of the invention.
Figure 5:
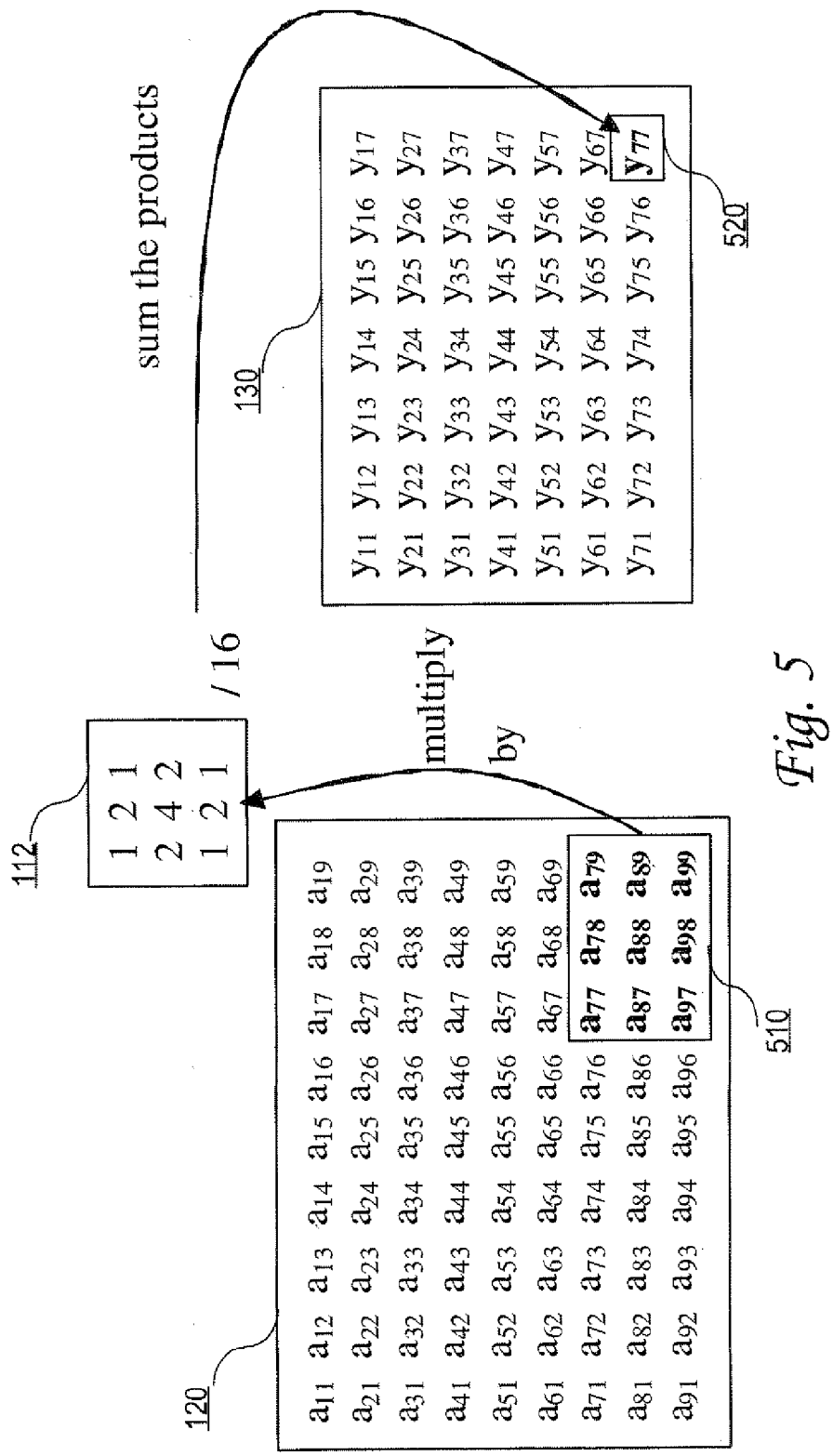
FIG. 5 depicts an example of technique for computing values for a Filtered Matrix from a Partial Image, in accordance with an embodiment of the invention.

FIGS. 3-5 depict examples of a technique for computing values for a filtered matrix from a partial image, in accordance with an embodiment of the invention. In an embodiment, a partial image 120 is provided as an array, or a window, containing pixel information. The size of the partial image 120 may vary and may depend on the implementation of the image capturing approach.

A partial image 120 may be referred to as an n-by-n window. Implementations of the partial image 120 are not limited to any particular size of the window. Any n-by-n array (window) may be used to store information about the partial image 120. In specific implementations, the n-by-n window may be any window that has a size 5×5, 7×7, 9×9, 11×11, etc. Alternatively, any other data structure may be used to store information about the partial image 120.

In an embodiment, a partial image 120 is a 9-by-9 pixel square array that contains pixel information for 9×9 pixels of the overall image 110. In other embodiments, the partial image is smaller than a 9-by-9 pixel square array; in other embodiments, the partial image 120 is larger than a 9-by-9 pixel square array. In some embodiments, the partial image 120 is a rectangular array, but not a square array.

Referring first to FIG. 3, an image filter 184 (FIG. 1) uses the values from a 9×9 partial image 120 to compute values for a filtered matrix 130, in accordance with an embodiment of the invention. In an embodiment, the image filter 184 processes the partial image 120 starting from selecting a group of pixels in the upper left corner of the partial image 120.

In an embodiment, a selected array 310 in FIG. 3 is a 3×3 array of the pixels selected from the partial image 120. In another embodiment, the selected array 310 is an array that is larger than a 3×3 array. In other embodiment, the selected array 310 is an array that is smaller than a 3×3 array.

In an embodiment, the values in the selected array 310 are multiplied by a 3×3 filter 112. Filter 112, also referred as a "Y" filter, has a low pass quality and is designed in such a way that the pixel information for the central pixel of the 3×3 selected array is emphasized the most, while the pixel information of the corner pixels of the 3×3 selected array are deemphasized. The size of the filter 112 corresponds to the size of the selected 310 array of pixels of the partial image 120. In another embodiment, any type of a filter may be used to process the partial image 120. In other embodiment, no filter is used to process the partial image 120.

In an embodiment, a 3×3 filter 112 has a denominator with a value of "16," which corresponds to the sum of all entries in the 3×3 array 112. The value "16" is selected in order to maintain the range of the values and to prevent an increase of the values with respect to the values in the partial image 120.

The filter 112 smoothes out a noise signal present in the partial image 120. For example, the filter 112 allows at least partial elimination of the noise information for detail areas because the filter 112 averages the values of the adjacent pixels in the partial image 120. Applying the filter 112 allows balancing the red, green and blue color components. In an embodiment, the resulting value 320 represents intensity (or semi-intensity). The resulting value 320 is entered as $y_{11}$ in the filtered matrix 130.

In an embodiment, the process of computing elements of the filtered matrix 130 is repeated as depicted in FIG. 4, in which the example with a 3×3 filter 112 is continued from FIG. 3. As depicted in FIG. 4, an image filter 184 selects a second 3×3 array of the pixels 410, multiplies the pixel values in the second array 410 by the 3×3 filter 112 that has a denominator with a value of "16," and obtains a resulting value 420. The resulting value 420 is entered as $y_{12}$ in the filtered matrix 130.

In an embodiment, the process of computing elements of the filtered matrix 130 is repeated until the last value of the filtered matrix 130 is computed, as it is depicted in FIG. 5, in which the example with a 3×3 filter 112 is continued from FIG. 3-4. As illustrated in FIG. 5, an image filter 184 selects the last 3×3 array of the pixels 510, multiples the pixel values in the last array 510 by the 3×3 filter 112 that has a denominator with a value of "16," and obtains a resulting value 520. The resulting value 520 is entered as $y_{77}$ in the filtered matrix 130.

The size of the resulting filtered matrix 130 is smaller than the size of the partial image 120 because of the way the pixel values of the partial image 120 are processed. For example, it may take three pixels in each direction (total of nine pixels) to generate one value for the filtered matrix 130. Hence, if the partial image 120 is an n-by-n window, then a resulting filtered matrix 130 may be a "(n−2) by (n−2)" array. For instance, if the partial image 120 is a 9×9 array, then the filtered matrix 130 is a 7×7 array.

In an embodiment, the resulting 7×7 filtered matrix 130 is also referred to as a 7×7 "Y" window. Values stored in the filtered matrix 130 contain distinctive values that characterize, for example, color intensity for clusters of pixels of the partial image 120.

Referring again to FIG. 10, in step 1006, an X-Gradient Map 140 and an X-Gradient Sign Map 150 are computed.

A gradient is a vector operation that operates on a scalar function to produce a vector that has a magnitude value and a direction. The magnitude represents the maximum rate of change of the function at the point of the gradient, and the direction represents the direction of the maximum rate of change. The gradient computed for two values is a vector for which the magnitude represents the rate of change at the point of the gradient, and for which the direction represents the direction of the change.

A gradient is another word for a "slope." For example, the higher the gradient of a graph at a point is, the steeper the line at that point is. A positive gradient means that the line slopes upward. A negative gradient means that the line slopes downwards.

The purpose of computing gradients for a digital image is to obtain a measure of the changes in the image characteristic for the digital image. For example, if a cluster of pixels in an overall image 110 corresponds to a region in the overall image 110 that depicts an edge of some object, then the gradients will be monotonic.

According to another example, if a cluster of pixels in an overall image 110 corresponds to a region in the overall image 110 that depicts a vertical edge of some object, then a vertical gradient along the edge would be more monotonic than a horizontal gradient across the edge because, for the vertical edge, an overall magnitude of the changes in color values or intensity values in the vertical direction may be less significant than an overall magnitude of the changes in color values or intensity values in the horizontal direction.

In contrast to the monotonic characteristics of the gradients for the edges, the gradients for flat areas depicted in an overall image 110 are rather chaotic. The gradients for the flat area seem to point to various directions.

The gradient map is based on the observation that gradients in one type of area of the overall image have similar characteristics. For example, the gradients in an area that includes an edge are monotonic. In a flat area that depicts a relatively insignificant amount of details, the gradients are chaotic, i.e., there is a significant fluctuation in the gradient's directions and the gradient's magnitudes for the gradients computed for that area. In a detail area that depicts a relatively significant amount of details, the gradients vary from being monotonic to being chaotic. Depending on nature of the detail region, the gradients may be monotonic if the detail is well organized, or the gradients may be chaotic if the detail region contains very few details.

Figure 11:
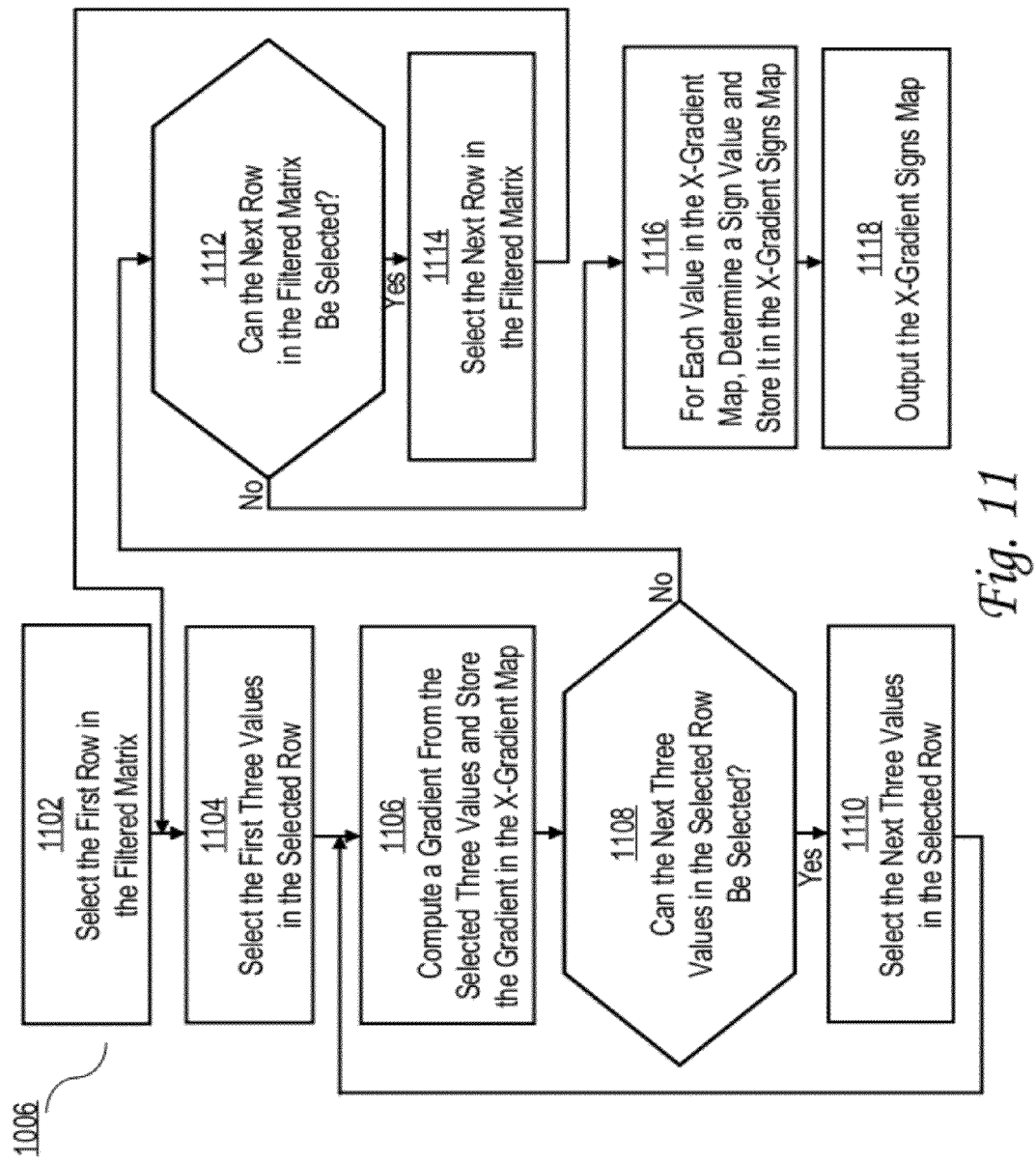
FIG. 11 depicts an example of technique for computing an X-Gradient Map and an X-Gradient Signs Map, in accordance with an embodiment of the invention.

In an embodiment, the values for the X-Gradient Map 140 and the values for the X-Gradient Signs Map 150 are computed by a gradient processor 186, which is depicted in FIG. 1. An embodiment of computing the values for the X-Gradient Map 140 and the values for the X-Gradient Signs Map 150 is shown in FIG. 11. Examples of computing the values for the X-Gradient Map 140 are described with reference to FIGS. 6-7. An example of computing the values for the X-Gradient Signs Map 150 is described with reference to FIG. 9.

Referring again to FIG. 10, in step 1008, a SUM-X of sign changes in the X-Gradient Signs Map 150 is computed. In an embodiment, the SUM-X of sign changes in the X-Gradient Signs Map 150 is computed by a gradient processor 186, which is depicted in FIG. 1. An embodiment of computing the sum of sign changes in the X-Gradient Signs Map 150 is described in reference to FIG. 11. This will be discussed in detail in a later section.

Figure 8:
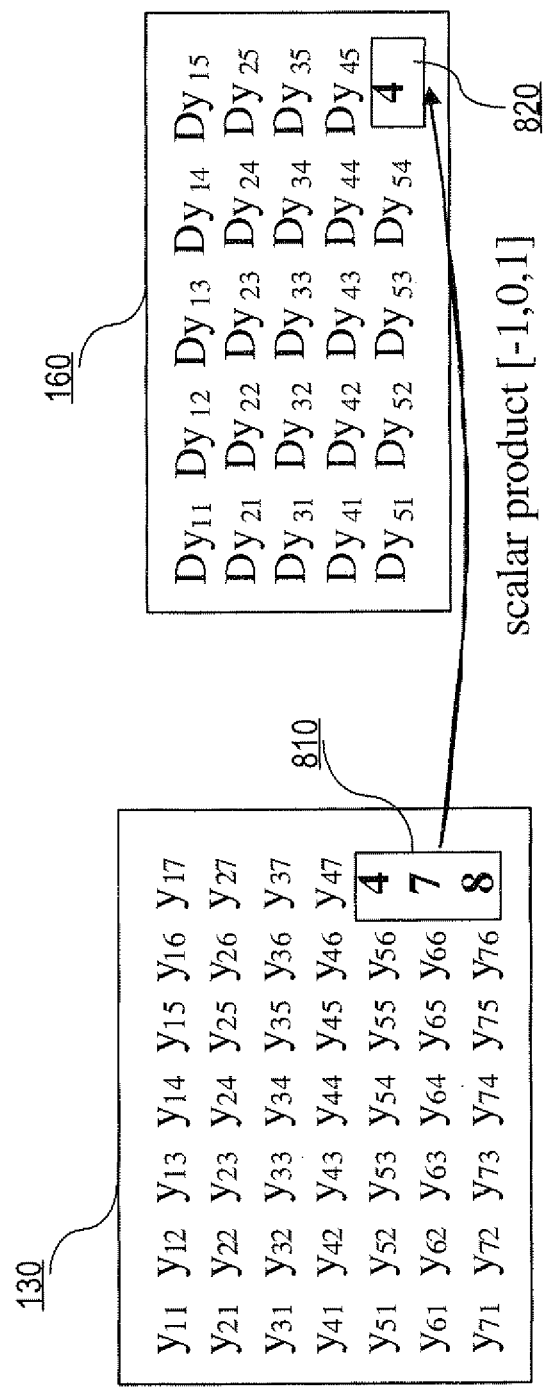
FIG. 8 depicts an example of technique for computing a Y-Gradient Map, in accordance with an embodiment of the invention.

Referring again to FIG. 10, in step 1012, a Y-Gradient Map 160 and a Y-Gradient Sign Map 170 are computed. In an embodiment, the values for the Y-Gradient Map 160 and the values for the Y-Gradient Signs Map 170 are computed by a gradient processor 186, which is depicted in FIG. 1. An examples of a technique for computing the values for the Y-Gradient Map 160 and the values for the Y-Gradient Signs map 170 is described in reference to FIG. 12. An example of computing the values for the Y-Gradient Map 160 is shown in FIG. 8. This will be discussed in detail in a later section.

Referring again to FIG. 10, in step 1014, a SUM-Y of sign changes in the Y-Gradient Signs Map 170 is computed. In an embodiment, the SUM-Y of sign changes in the Y-Gradient Signs Map 150 is computed by a gradient processor 186, which is depicted in FIG. 1. This will be discussed in detail in a later section.

Referring again to FIG. 10, in step 1016, values for a Texture Image Map 190 are computed. In an embodiment, the values for the Texture Image Map 190 are computed by a Texture Processor 188, which is depicted in FIG. 1. An embodiment of computing the values for the Texture Image Map 190 is described with reference to FIG. 13, which will be discussed in detail in a later section.

Referring again to FIG. 10, in step 1018, the process checks whether all partial images of the overall image 110 have been processed. If so, then the process proceeds to step 1020, in which it is assumed that all values for a Texture Image Map 190 have been already computed. However, if all partial images of the overall image 110 have not be processed, then the process proceeds to step 1022, in which a next partial image from the overall image 110 is determined and, in step 1004, a new filtered matrix 130 is computed from the selected partial image. The process of selecting a partial image and computing a texture image value corresponding to a central pixel of the partial image is repeated for each partial image of the overall image 110.

In an embodiment, computing a texture image values may be implemented in a parallel system in which multiple threats or processes run in parallel and simultaneously perform texture image computation for the partial images of the overall image 110. For example, the computations may be implemented in the MATLAB application, a proprietary product of MathWorks Inc.

4.0 PROCESS OF COMPUTING AN X-GRADIENT MAP AND AN X-GRADIENT SIGNS MAP

A gradient map is computed from information stored in a filtered matrix 130 for a partial image 120 of an overall image 110. A gradient value computed for a particular pixel in a particular partial image 120 captures characteristics of the particular pixel in reference to the pixel information of the pixels surrounding the particular pixel.

Depending on the type of the environment depicted in a partial image, the gradients may be monotonic if the region contains an edge, or chaotic if the region contains very few details. For example, the gradients in an area of a partial image that includes an edge are monotonic, i.e., the gradients across the edge are pointing to pretty much the same direction. The gradients in a flat area that depicts a relatively insignificant amount of details, the gradients are chaotic, i.e., there is a significant fluctuation in the gradient's directions and the gradient's magnitudes for the gradients computed for that area. In a detail area that depicts a relatively significant amount of details, the gradients vary from being monotonic to being chaotic.

The homogeneity of the gradients may be determined based on the changes in the signs of the gradients. For example, if the signs of the gradients remain relatively monotonic in a given direction, then the corresponding area in the overall image 110 most likely depicts an edge or a detailed area with mostly edges. However, if the signs of the gradients in a given direction seem to be very chaotic, then the corresponding area in the overall image 110 most likely depicts a flat area or a detailed area with very few details.

In an embodiment, the gradients are computed separately for two different directions. For example, using the information stored in a filtered matrix 130, a first-direction-gradient map is computed for the gradients in the first directions, and a second-direction-gradient map is computed for the gradients in the second direction. For instance, the first-direction-gradient map may be computed for the horizontal ("X") direction and may be referred to as an X-Gradient Map 140, while the second-direction-gradient map may be computed for the vertical ("Y") direction and may be referred to as a Y-Gradient Map 160, both depicted in FIG. 1

The size of the X-Gradient Map 140 depends on the size of the filtered matrix 130, and is usually smaller than the size of the filtered matrix 130. For example, if the filtered matrix 130 is a 7×7× array, then the X-Gradient Map 140 is usually a 5×5 matrix because, as described below, the gradients are computed from tuples of elements of the filtered matrix 130, and the number of tuples in the filtered matrix 130 is smaller than the number of elements in the filtered matrix 130.

Figure 6:
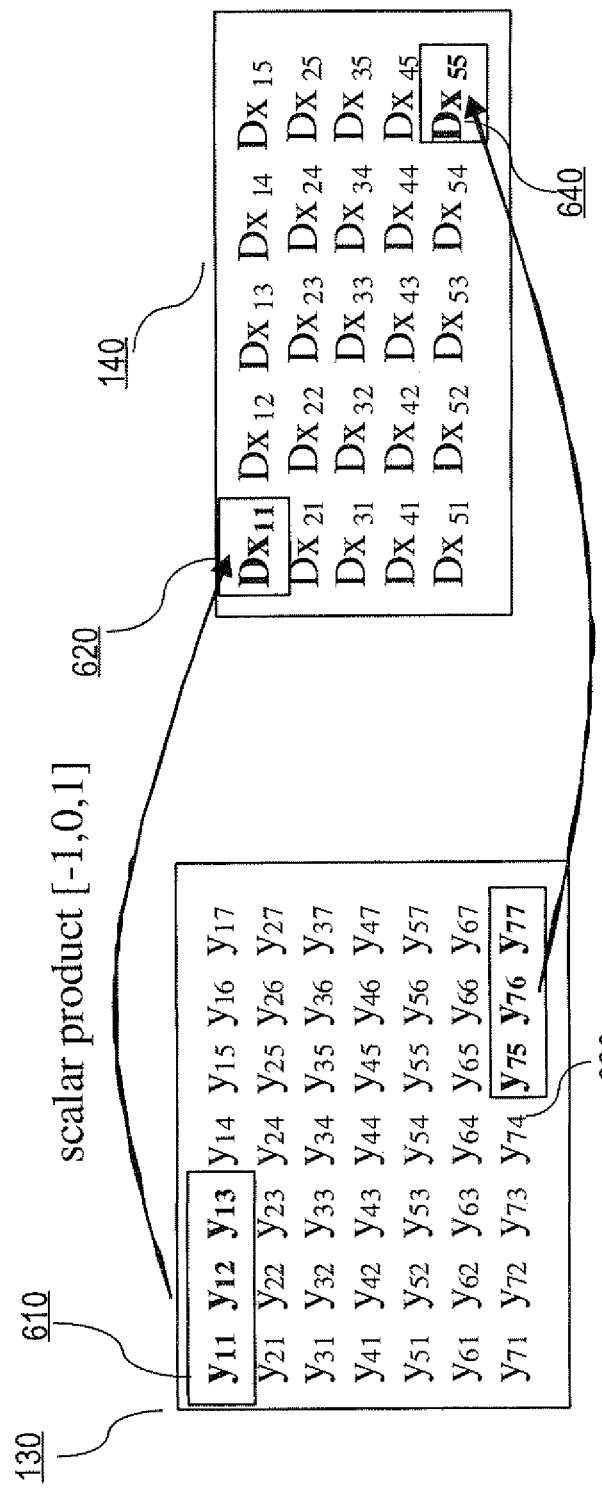
FIG. 6 depicts an example of technique for computing an X-Gradient Map, in accordance with an embodiment of the invention.
Figure 7:
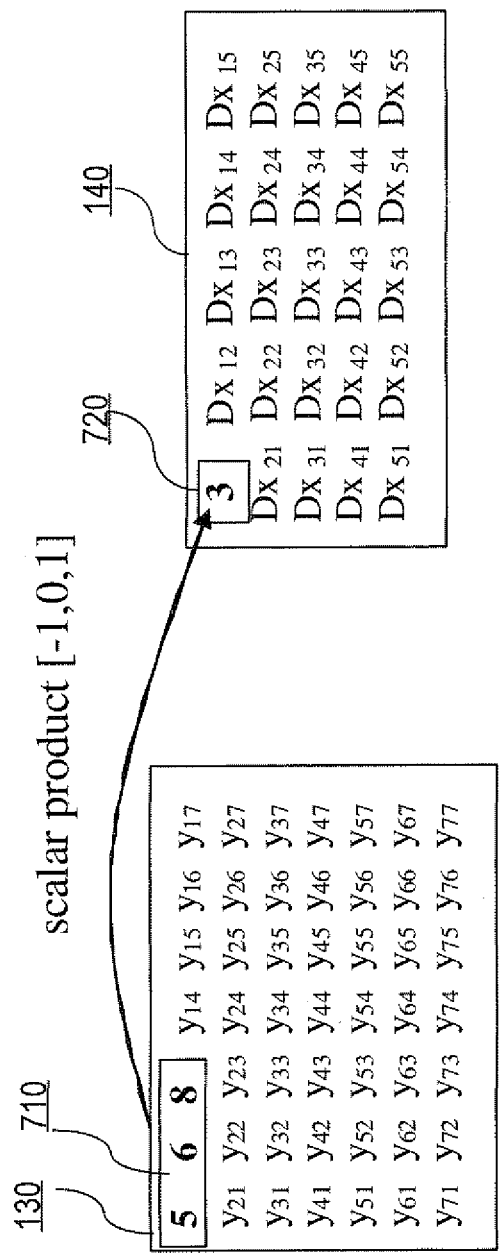
FIG. 7 depicts an example of technique for computing an X-Gradient Map, in accordance with an embodiment of the invention.
Figure 9:
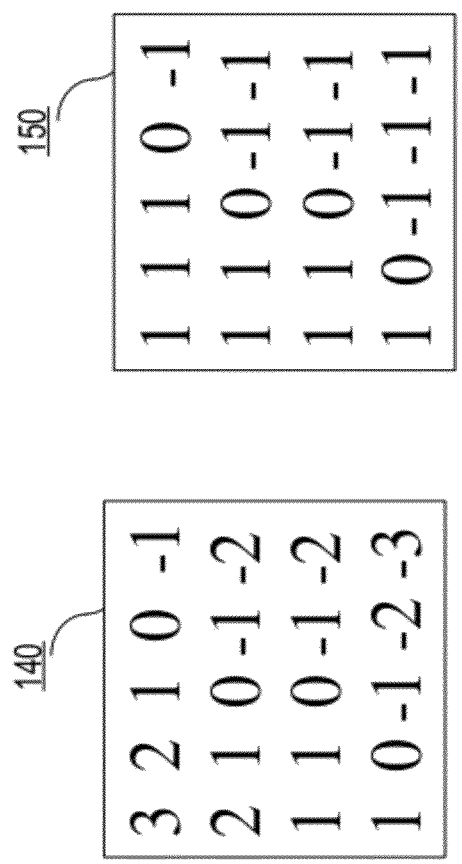
FIG. 9 depicts an example of technique for computing an X-Gradient Map and an X-Gradient Signs Map, in accordance with an embodiment of the invention.

FIGS. 6-7 depict an example of a technique for computing an X-Gradient Map 140, in accordance with an embodiment of the invention; FIG. 9 depicts an example of a technique for computing an X-Gradient Signs Map, in accordance with an embodiment of the invention; and FIG. 11 depicts an example of technique for computing an X-Gradient Map and an X-Gradient Signs Map, in accordance with an embodiment of the invention.

Implementations of the gradient maps may include various data structures, including m-by-m arrays storing information about the respective gradients. The gradient maps are not limited to any particular size of the gradient array. For example, if the implemented support is 5, then the gradient map in the X direction has a size 5×5. According to another example, if the implemented support is 7, then the gradient map in the X direction has a size of 5×7.

Referring first to FIG. 6, in an embodiment, a gradient processor computes a 5×5 X-Gradient Map 140 from the pixel information stored in a 7×7 filtered matrix 130. In an embodiment, an X-Gradient Map 140 is computed in steps and for each "tuple" of elements of a filtered matrix 130.

In the X context, a tuple is a sequence of elements located in the same row of the filtered matrix 130 as a particular pixel. For example, a tuple 610 of three consecutive elements in a horizontal direction starting at the element $y_{11}$ may include $y_{11}$, $y_{12}$, $y_{13}$, and may be represented as a vector [$y_{11}$, $y_{12}$, $y_{13}$], while a tuple 630 of three subsequent elements in a horizontal direction starting at the element $y_{75}$ may include $y_{75}$, $y_{76}$, $y_{77}$, and may be represented as a vector [$y_{75}$, $y_{76}$, $y_{77}$]$^T$, wherein "T" means "transposed."

As depicted in FIG. 6, in an embodiment, using the pixel information for a vector [$y_{11}$, $y_{12}$, $y_{13}$] 610, a first gradient, comprising a gradient magnitude and a gradient sign, is computed and stored as a gradient value 620 ($Dx_{11}$) in a X-Gradient Map 140. Then, using the pixel information for a vector [$y_{12}$, $y_{13}$, $y_{14}$], a second gradient, comprising a gradient magnitude and a gradient sign, is computed and stored as a gradient value $Dx_{12}$. The process is repeated until, using the pixel information for vector [$y_{75}$, $y_{76}$, $y_{77}$], a last gradient, comprising a gradient magnitude and a gradient sign, is computed and stored as a gradient value $Dx_{55}$.

In an embodiment, the gradients are computed despite noise information contained in a partial image 120. To reduce the impact of the noise information stored in a partial image 120 on the gradient's computation, each gradient value is computed from three, not from two, adjacent pixels. The noise information impacts more significantly a rate of change in color or intensity of two adjacent pixels than the rate of change in color or intensity of two non-consecutive pixels.

To minimize the influence of the noise data on the gradient values, the gradients in each of the gradient maps are computed using data associated with every other element in a tuple (vector). For example, if a tuple contains three elements, then the gradient value may be computed using the data associated with the first and third element of the tuple, but not the data associated with the second element in the tuple.

Referring again to FIG. 6, in an embodiment, a vector 610, containing the first three consecutive values in the first row in the 7×7 filtered matrix 130 is selected. Then, a scalar product of a vector $V=[-1, 0, 1]^T$ and the vector 610 is computed to obtain a gradient value for the first element of the X-Gradient Map. Then, a next vector, containing the second, third and four values from the first row in the 7×7 filtered matrix 130, is selected, and a scalar product of the vector $V=[-1, 0, 1]^T$ and that vector is computed to obtain a gradient value for the second element of the X-Gradient Map. The process is repeated for each triplet of values in the first row. Then, the process is repeated for each triplet of values in the second row, and so forth, until the last vector 630 from the filtered matrix 130 is selected and a corresponding last element 640 of the X-Gradient Map is computed.

In an example depicted in FIG. 7, in an embodiment, a gradient in the X-direction is computed using a vector 710 of values extracted from the first horizontal row of a filtered matrix 130. The vector 710 comprises values [5, 6, 8]. The values in the vector are multiplied by a vector $V=[-1, 0, 1]^T$, and a sum of the resulting three values is computed. Upon multiplying the vector 710, having values [5, 6, 8] by the vector $V=[-1, 0, 1]^T$, one receives $(-5)+8=3$. The value "3" is entered to the X-Gradient Map 140 as an element $Dx_{11}$ 720.

In an embodiment, the gradient processor 186 also computes an X-Gradient Signs Map 150 from an X-Gradient Map 140. An example of computing an X-Gradient Signs Map 150 is depicted in FIG. 9.

FIG. 9 depicts an example of determining the values for the X-Gradient Signs Map 150 from the given values of the X-Gradient Map 140. In an embodiment, for each value in the X-Gradient Map 140, one value for the X-Gradient Signs Map 150 is computed. If a particular value in the X-Gradient Map 140 is less than "0," then the respective particular value in the X-Gradient Signs Map 150 is "−1." If a particular value in the X-Gradient Map 140 is greater than "0," then the respective particular value in the X-Gradient Signs Map 150 is "1." If the value in the X-Gradient Map 150 is "0," then the respective particular value in the X-Gradient Signs Map 150 is "0." For example, the signs values for the vector [3, 2, 1, 0, −1] are [1, 1, 1, 0, −1].

In an embodiment, the gradient processor 186 also determines how many times the sign of the gradient changes in the X-Gradient Signs Map 150. The changes are computed using two values computed from the X-Gradient Signs Map 150. The first value is computed for any two consecutive values in the X-Gradient Signs Map 150, while the second value is computed from the first and the third values of every three-value horizontal tuple in the X-Gradient Signs Map 150.

In an embodiment, the first value is computed for each two consecutive values in each row of values of the X-Gradient Signs Map 150. A vector $[1, -1]^T$ is applied to the two consecutive values, wherein "T" means "transposed." For example, the vector $[1, -1]^T$ may be applied to the first two consecutive values in the X-Gradient Signs Map 150, and the first-change$_x$ may be computed as follows:

$$\text{first-change}_x = [dx_{11}, dx_{12}] * [1,-1]^T,$$

wherein the first-change$_x$ is the first value described above, $[dx_{11}, dx_{12}]$ are the first two elements in the first row of the X-Gradient Signs Map 150, and $[1, -1]^T$ is a vector.

In the example depicted in FIG. 9, the first-change$_x$ is computed from [1, 1] of the X-Gradient Signs Map 150. The values [1, 1] are multiplied by the vector $[1, -1]^T$, and the result is "0." This means that there is no change in sign for the particular two consecutive values in the first row of the X-Gradient Signs Map 150.

However, if the first-change$_x$ value were "1," then it would be known that the signs for the particular two consecutive values are changing, and that the change is either from a negative gradient to a zero gradient for the respective values, or from a zero gradient to a positive gradient for the respective values. Furthermore, if the first-change$_x$ value were "−1," then it would be known that the signs for particular two consecutive values are changing, and that the change is either from a positive gradient to a zero gradient for the respective values, or from a zero gradient to a negative gradient for the respective values.

In an embodiment, the second change value is computed for every three-element horizontal tuple in every row of the X-Gradient Map 150. A vector $[1, 0, -1]^T$ is applied to the three consecutive values. For example, the vector $[1, 0, -1]^T$ may be applied to the first three consecutive values in the X-Gradient Signs Map 150, and the second-change$_x$ may be computed as follows:

$$\text{second-change}_x = [dx_{11}, dx_{12}, dx_{13}] * [1,0,-1]^T,$$

wherein second-change$_x$ is the second value described above, $[dx_{11}, dx_{12}, dx_{13}]$ are the first three elements in the first row of the X-Gradient Signs Map 150, and $[1, 0, -1]^T$ is a vector.

In the example depicted in FIG. 9, the second-change$_x$ is computed from [1, 1, 1] of the X-Gradient Signs Map 150. The values [1, 1, 1] are multiplied by the vector $[1, 0, -1]^T$, and the result is "0." This means that there is no change in sign for the first and third values of the particular consecutive values in the X-Gradient Signs Map 150.

However, if the second-change$_x$ value were "1," then it would be known that the signs for a particular three consecutive values are changing, and that the change is either from a negative gradient to a zero gradient for the respective values, or from a zero gradient to a positive gradient for the respective values. Furthermore, if the second-change$_x$ value were "−1," then it would be known that the signs for a particular three consecutive values are changing, and that the change is either from a positive gradient to a zero gradient for the respective values, or from a zero gradient to a negative gradient for the respective values.

In an embodiment, if the X-Gradient Signs Map 150 is a 5×5 matrix, then the gradient processor 186 should obtain twenty first-change$_x$ values after all the first-change$_x$ values are computed. There are twenty first-change$_x$ values because four first-change$_x$ values may be computed for each row in the X-Gradient Signs Map 150 (there are four pairs of values per each row in the X-Gradient Signs Map 150), and there are five rows in the X-Gradient Signs Map 150.

In an embodiment, if the X-Gradient Signs Map 150 is a 5×5 matrix, then the gradient processor 186 should obtain fifteen second-change$_x$ values after all the second-change$_x$ values are computed. There are fifteen second-change$_x$ values because three first-change$_x$ values may be computed for each row in the X-Gradient Signs Map 150 (there are three three-element tuples of values per each row in the X-Gradient Signs Map 150), and there are five rows in the X-Gradient Signs Map 150.

The gradient processor 186 also takes the absolute values from all twenty first-change$_x$ and fifteen second-change$_x$, and computes a SUM-X, as a sum of the absolute values. The SUM-X is a measure of changes in the sign of the gradients in the X-direction for the particular partial image 110.

FIG. 11 depicts an example of a technique for computing an X-Gradient Map and an X-Gradient Signs Map, in accordance with an embodiment of the invention. The X-Gradient Map is computed from a filtered matrix 130.

In step 1102, a first row in a filtered matrix is selected. For example, as depicted in FIG. 6, the first row 610 of the filtered matrix 130 may contain the elements $y_{11}$, $y_{12}$, $y_{13}$, $y_{14}$, $y_{15}$, $y_{16}$ and $y_{17}$.

In step 1104, from the selected row, the first three values are chosen. For example, as depicted in FIG. 6, from the first row 610 of the filtered matrix 130 the first three values include the elements $y_{11}$, $y_{12}$ and $y_{13}$.

In step 1106, a gradient is computed from the three selected values and stored in the X-Gradient Map. For example, as depicted in FIG. 6, from the values of the elements $y_{11}$, $y_{12}$ and $y_{13}$ one gradient value is computed and stored in the X-Gradient Map as element $Dx_{11}$. The X-Gradient Map is computed in an X-direction. In an embodiment, the X-direction is a horizontal direction. However, the selection of the X-direction is arbitrary and depends on the implementation.

In an embodiment, a gradient value for the three elements selected from the filtered matrix is computed by applying a vector $V=[-1\ 0\ 1]^T$ to the three values and computing a sum of the partial products. For example, as depicted in FIG. 7, by applying $V=[-1\ 0\ 1]^T$ to the three-value-vector 710, having values [5, 6, 8], one value of "3" is obtained and "3" is stored in the X-Gradient Map as the value for element $Dx_{11}$.

In step 1108, the process checks whether next three values in the selected row of the filtered matrix may be selected. If so, the process proceeds to step 1110; otherwise, the process proceeds to step 1112. For example, as depicted in FIG. 6, the next three values in the first row may be selected as $y_{12}$, $y_{13}$ and $y_{14}$. The process may thus proceed to step 1110.

In step 1110, since it is determined that the next three values in the selected row can be chosen, the next three values are selected, and the process proceeds to step 1106, in which a next gradient value is computed and stored in the X-Gradient Map.

In step 1112, the process determined that the next three values in the selected row cannot be chosen because there is an insufficient number of remaining elements in the selected row. Hence, the process determines whether a next row in the filtered matrix can be selected. For example, as depicted in FIG. 6, the (next) second row can be selected in the filtered matrix. The second row in the filtered matrix depicted in FIG. 6 contains the elements $y_{21}$, $y_{22}$, $y_{23}$, $y_{24}$, $y_{25}$, $y_{26}$ and $y_{27}$.

If the next row in the filtered matrix can be selected, then the process proceeds to step 1114; otherwise, the process proceeds to step 1116.

In step 1114, since it is determined that the next row in the filtered matrix can be chosen, the next row is selected, and the process proceeds to step 1104, in which the first three values from the selected row are chosen and used to compute a gradient value for the X-Gradient Map.

In step 1116, the X-Gradient Map is completed. The X-Gradient Map is smaller in size than the filtered matrix because for each three elements in the filtered matrix only one value for the X-Gradient Map is computed. For example, if the filtered matrix was a 7×7 matrix, then, in an embodiment, the X-Gradient Map is a 5×5 matrix.

Also in step 1116, an X-Gradient Signs Map 150 is determined. For each value in the X-Gradient Map, a sign value is determined and stored in an X-Gradient Signs Map. If a particular value in the X-Gradient Map is less than "0," then the respective particular value in the X-Gradient Signs Map is "−1." If a particular value in the X-Gradient Map is greater than "0," then the respective particular value in the X-Gradient Signs Map is "1." If the value in the X-Gradient Map is "0," then the respective particular value in the X-Gradient Signs Map is "0." In example depicted in FIG. 9, the signs values for the vector [3, 2, 1, 0, −1] are [1, 1, 1, 0, −1].

The gradient processor 186 also takes the absolute values from all twenty first-change$_x$ and fifteen second-change$_x$, and computes a SUM-X, as a sum of the absolute values. The SUM-X is a measure of changes in the sign of the gradients in the X-direction for the particular partial image 110.

Referring again to FIG. 11, in step 1118, the X-Gradient Signs Map is completed and outputted for further processing.

5.0 PROCESS OF COMPUTING A Y-GRADIENT MAP AND A Y-GRADIENT SIGNS MAP

While the purpose of computing gradients in an X-direction was to obtain a measure of the changes in an image characteristic for the values in the X-direction, the purpose of computing gradients in a Y-direction is to obtain a measure of the changes in the image characteristics in the Y-direction.

In an embodiment, the Y-direction is different from the X-direction. For example, if the X-direction was a horizontal direction, then the Y-direction may be a vertical direction. However, the selection of the X-direction and the Y-direction is arbitrary and depends on the implementation.

Figure 12:
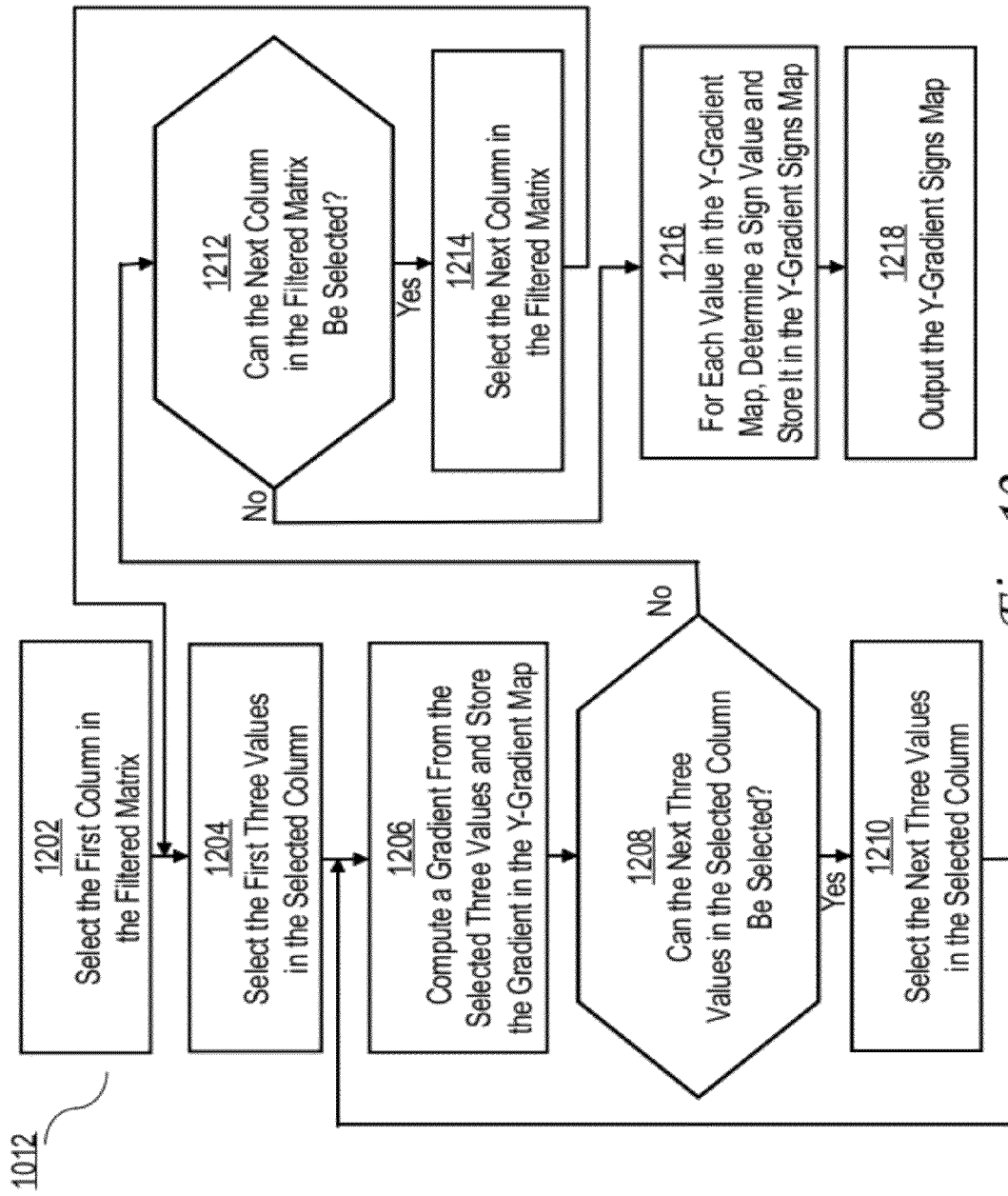
FIG. 12 depicts an example of technique for computing a Y-Gradient Map and a Y-Gradient Signs Map, in accordance with an embodiment of the invention.

FIG. 8 depicts an example of a technique for computing a Y-Gradient Map, in accordance with an embodiment of the invention; and FIG. 12 depicts an example of technique for computing a Y-Gradient Map and a Y-Gradient Signs Map, in accordance with an embodiment of the invention.

In an embodiment, a Y-Gradient Map 160 is computed from tuples of values selected from the columns of the filtered matrix 130. The process is repeated for each triplet of values in the first column; then for each triplet in the second column, and so forth. In result, all gradient values for a gradient metric in the Y direction are obtained.

In an example depicted in FIG. 8, in an embodiment, the last gradient in the Y-direction is computed using a vector 810 of values extracted from the last vertical row of a filtered matrix 130. The vector 810 comprises values $$\begin{bmatrix} 4 \\ 7 \\ 8 \end{bmatrix},$$

which can also be represented as $[4, 7, 8]^T$, where "T" means "transposed."

The vector 810 $[4, 7, 8]^T$ is multiplied by a vector $V=[-1, 0, 1]$ and a sum of the resulting three values is computed. In the example depicted in FIG. 7, upon multiplying the vector 810 $[4, 7, 8]^T$ by the vector $V=[-1, 0, 1]$, one receives $(-4)+8=4$. The value "4" is entered to the Y-Gradient map 160 as an element $Dy_{55}$ 820.

In an embodiment, in each triplet of values, the intensity value for the middle value is skipped. Skipping the intensity value for the middle value in a triplet of values allows generating higher values for gradients because a difference in intensity value is most likely larger for two values separated by another values than for two adjacent values. For example, if the intensity values for a value triplet are [10, 13, 15], then that indicates that the intensity is gradually increased from the first value via the second value to the third value, and that the difference in the intensity values for the first and third values is "5," while the difference for each of the pair of the adjacent values is "3" and "2," respectively Hence, skipping the intensity value for the middle value in each value triple might yield higher values for the gradients. This process causes the gradient value to be more significant than noise, and thus, the final result is less sensitive to noise.

In an embodiment, the gradient processor 186 also computes a Y-Gradient Signs Map 170 from a Y-Gradient Map 160. The process is analogous to computing an X-Gradient Signs Map 150, except the values for the Y-Gradient Signs Map 170 is computed from the Y-Gradient Map 160.

In an embodiment, the gradient processor 186 also determines how many times the sign of the gradient changes in the Y-Gradient Signs Map 170. The changes are computed using two values computed from the Y-Gradient Signs Map 170. The first value is computed for any two consecutive values in the Y-Gradient Signs Map 170, while the second value is computed from the first and the third values of every three-value horizontal tuple in the Y-Gradient Signs Map 170.

In an embodiment, the first value is computed for each two consecutive values in each column of values of the Y-Gradient Signs Map 170. A vector [1, −1] is applied to the two consecutive values. For example, the vector [1, −1] may be applied to the first two consecutive values in the first column in the Y-Gradient Signs Map 150, and the first-change$_y$ may be computed as follows:

first-change$_y$=[$dy_{11}$,$dy_{21}$]$^T$*[1,−1], wherein first-change$_y$ is the first value described above, [$dy_{11}$, $dy_{21}$]$^T$ are the first two elements in the first column in the Y-Gradient Signs Map 170, and [1, −1] is a vector.

If, in an embodiment, the first-change$_y$ is "0," then there is no change in sign for the particular consecutive values in the Y-Gradient Signs Map 170. However, if the first-change$_y$ were "1," then it would be known that the signs for a particular two consecutive values are changing, and that the change is either from a negative gradient to a zero gradient for the respective values, or from a zero gradient to a positive gradient for the respective values. Furthermore, if the first-change$_y$ were "−1," then it would be known that the signs for a particular two consecutive values are changing, and that the change is either from a positive gradient to a zero gradient for the respective values, or from a zero gradient to a negative gradient for the respective values.

In an embodiment, the second change value is computed for every three-element vertical tuple in every column of the Y-Gradient Map 170. Then, a vector [1, 0, −1] is applied to the three consecutive values. For example, the vector [1, 0, −1] may be applied to the first three consecutive values in the Y-Gradient Signs Map 170, and the second-change$_y$ may be computed as follows:

second-change$_y$=[$dy_{11}$,$dy_{21}$,$dy_{31}$]$^T$*[1,0,−1], wherein second-change$_y$ is the second value described above, [$dy_{11}$, $dy_{21}$, $dy_{31}$]$^T$ are the first three elements in the first column the Y-Gradient Signs Map 170, and [1, 0, −1] is a vector.

For example, if the second-change$_y$ is computed from [1, 1, 1]$^T$ of the Y-Gradient Signs Map 170, then the values [1, 1, 1] are multiplied by the vector [1, 0, −1], and the result is "0." This means that there is no change in sign for the first and third values of the particular consecutive values in the Y-Gradient Signs Map 170.

In an embodiment, if the Y-Gradient Signs Map 170 is a 5×5 matrix, then twenty first-change$_y$ values are obtained and fifteen second-change$_y$ values are obtained after all the first and second change$_y$ values are computed.

The gradient processor 186 also takes the absolute values from all twenty first-change$_y$ and fifteen second-change$_y$, and computes a SUM-Y, as a sum of the absolute values. The SUM-Y is a measure of changes in the sign of the gradients in the Y-direction for the particular partial image 110.

FIG. 12 depicts an example of technique 1012 for computing a Y-Gradient Map and a Y-Gradient Signs Map, in accordance with an embodiment of the invention. The Y-Gradient Map is computed from a filtered matrix. A filtered matrix is a matrix in which each element captures value information of a group of pixels selected from a partial image.

In step 1202, a first column in a filtered matrix is selected. In an example depicted in FIG. 8, the first column might contain the elements $y_{11}$, $y_{21}$, $y_{31}$, $y_{41}$, $y_{51}$, $y_{61}$ and $y_{71}$.

In step 1204, from the selected column, the first three values are chosen. In the example depicted in FIG. 8, from the first column the filtered matrix 130 the first three values include the elements $y_{11}$, $y_{21}$ and $y_{31}$.

In step 1206, a gradient is computed from the three selected values and stored in the Y-Gradient Map. In the example depicted in FIG. 8, from the values of the elements $y_{11}$, $y_{21}$ and $y_{31}$ one gradient value is computed and stored in the Y-Gradient Map as element $Dy_{11}$.

In an embodiment, a gradient value for the three elements selected from the filtered matrix is computed by applying a vector V=[−1, 0, 1] to the three values and computing a sum of the partial products. In the example depicted in FIG. 8, by applying V=[−1, 0, 1] to the three-value-vector [$y_{11}$, $y_{21}$, $y_{31}$]$^T$, one value is obtained and stored in the Y-Gradient Map as the value for element $Dy_{11}$.

In step 1208, the process checks whether next three values in the selected column of the filtered matrix may be selected. If so, the process proceeds to step 1210; otherwise, the process proceeds to step 1212. In the example depicted in FIG. 8, the next three values in the first column may be selected as $y_{21}$, $y_{31}$ and $y_{41}$. The process may thus proceed to step 1210.

In step 1210, since it is determined that the next three values in the selected column can be chosen, the next three values are selected, and the process proceeds to step 1206, in which a next gradient value is computed and stored in the Y-Gradient Map.

In step 1212, the process determined that the next three values in the selected column cannot be chosen because there is insufficient number of remaining elements in the selected column. Hence, the process determines whether a next column in the filtered matrix can be selected. In the example depicted in FIG. 8, the (next) second column can be selected in the filtered matrix. The second column in the filtered matrix depicted in FIG. 8 contains the elements $y_{12}$, $y_{22}$, $y_{32}$, $y_{42}$, $y_{52}$, $y_{62}$ and $y_{72}$.

If the next column in the filtered matrix can be selected, then the process proceeds to step 1214; otherwise, the process proceeds to step 1216.

In step 1214, since it is determined that the next column in the filtered matrix can be chosen, the next column is selected, and the process proceeds to step 1204, in which the first three values from the selected row are chosen and used to compute a gradient value for the Y-Gradient Map.

In step 1216, the Y-Gradient Map is completed. The Y-Gradient Map is smaller in size than the filtered matrix because for each three elements in the filtered matrix only one value for the Y-Gradient Map is computed. For example, if the filtered matrix was a 7×7 matrix, then, in an embodiment, the Y-Gradient Map is a 5×5 matrix for a support size of 5.

Also in step 1216, for each value in the Y-Gradient Map, a sign value is determined and stored in a Y-Gradient Signs Map. If a particular value in the Y-Gradient Map is less than "0," then the respective particular value in the Y-Gradient Signs Map is "−1." If a particular value in the Y-Gradient Map is greater than "0," then the respective particular value in the Y-Gradient Signs Map is "1." If the value in the Y-Gradient Map is "0," then the respective particular value in the Y-Gradient Signs Map is "0."

In step 1218, the Y-Gradient Signs Map is completed and outputted for further processing.

6.0 PROCESS OF COMPUTING A TEXTURE VALUE

Figure 13:
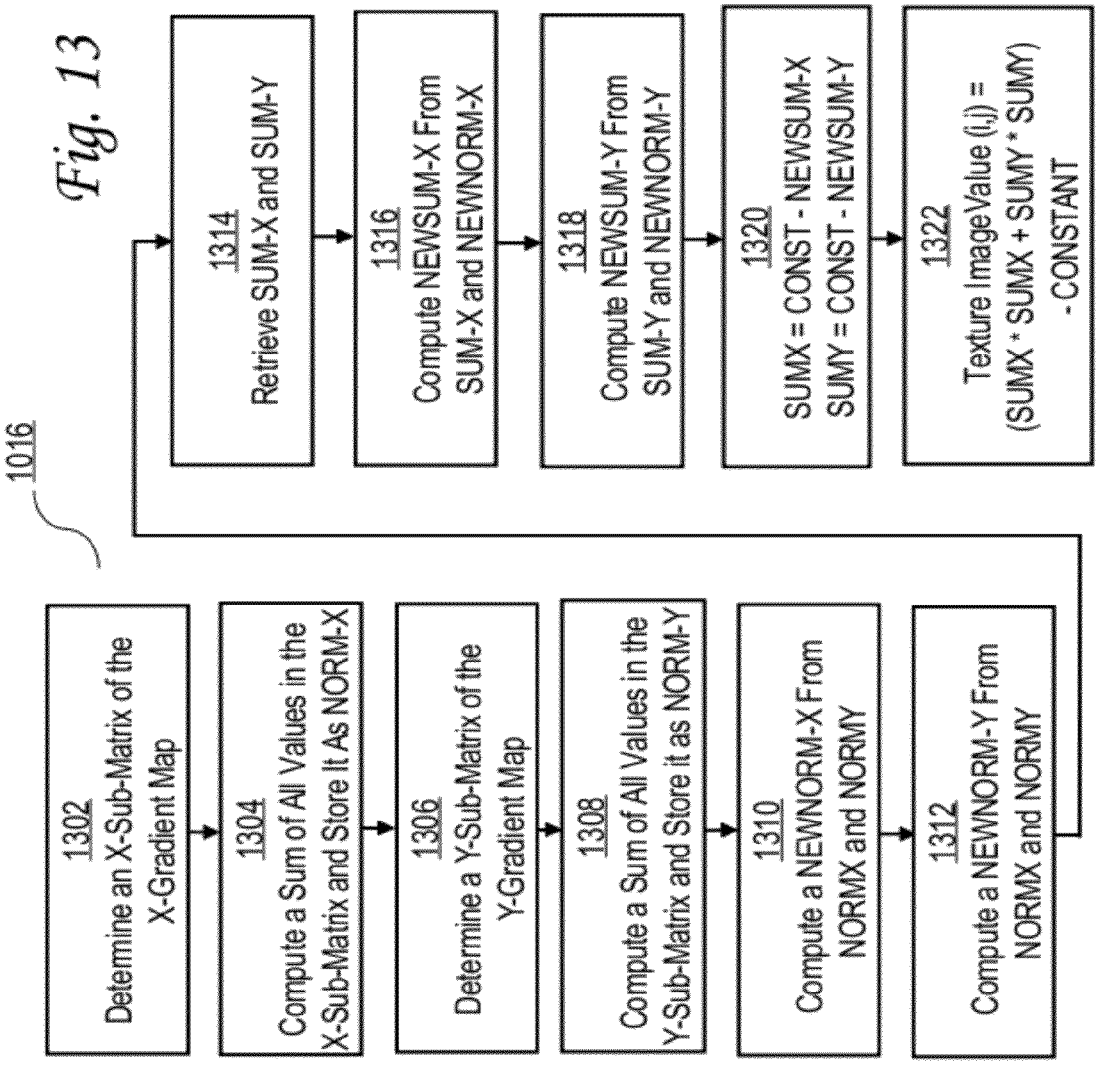
FIG. 13 depicts an example of technique for computing values for a Texture Image Map, in accordance with an embodiment of the invention.

The gradient maps and gradient signs maps are used to compute a value for a Texture Image Map, which contains texture values for the respective pixels in the overall image. In an embodiment, sub-matrixes for each of the gradient maps are determined and used to compute weights for each of the primary directions. An example of a technique for computing a texture value is shown in FIG. 13.

In step 1302, an X-sub-matrix is determined from the X-Gradient Map. For example, if the X-Gradient Map is a 5×5 matrix, then the X-sub-matrix is a 3×3 matrix obtained from the X-Gradient Map by deleting the first and the last rows and by deleting the first and the last column from the X-Gradient Map. The central pixel of the selected X-sub-matrix is the same pixels as the central pixel of the X-Gradient Map. In other embodiment, the X-sub-matrix may be selected by for example deleting the first and the second rows and by deleting the first and the second column from the X-Gradient Map. In other embodiment, the X-sub-matrix may be for example, the central pixel of the X-Gradient map.

In step 1304, in an embodiment, a sum of all values in the X-sub-matrix is computed and stored as a "NORM-X" value, also referred to as NORM-X. In an embodiment, the sum, computed by adding all values in the X-sub-matrix, represents a weight of the central gradients from the X-Gradient Map for the central pixel in the particular partial image. In other embodiment, the sum is a weighted sum of the values in the X-sub-matrix.

In an alternative embodiment, a sum of all absolute values in the X-sub-matrix is computed and stored as a NORM-X value. The sum computed from the absolute values may more precisely represent a fluctuation of the gradients in the X-sub-matrix in terms of the magnitude difference than the sum computed from raw values of the gradients in the X-sub-matrix.

In step 1306, a Y-sub-matrix is determined from the Y-Gradient Map. For example, if the Y-Gradient Map is a 5×5 matrix, then the Y-sub-matrix is a 3×3 matrix obtained from the Y-Gradient Map by deleting the first and the last rows and by deleting the first and the last column from the Y-Gradient Map. The central pixel of the selected Y-sub-matrix is the same pixels as the central pixel of the Y-Gradient Map. In other embodiment, the Y-sub-matrix may be selected by for example, deleting the first and the second rows and by deleting the first and the second column from the Y-Gradient Map.

In step 1308, in an embodiment, a sum of all values in the Y-sub-matrix is computed and stored as a "NORM-Y" value, also referred to as NORM-Y. In an embodiment, the sum, computed by adding all values in the X-sub-matrix, represents a weight of the central gradients from the X-Gradient Map for the central pixel in the particular partial image.

In an alternative embodiment, a sum of all absolute values in the Y-sub-matrix is computed and stored as a NORM-Y value. The sum computed from the absolute values may more precisely represent a fluctuation of the gradients in the Y-sub-matrix in terms of the magnitude difference than the sum computed from raw values of the gradients in the Y-sub-matrix.

In step 1310, a NEWNORM-X is computed from the NORM-X and the NORM-Y, and in step 1312, a NEWNORM-Y is computed from the NORM-X and the NORM-Y.

Various statistical methods may be implemented to compute the new norm values. Computing the new norm values involves dividing one value by a sum of the norms. However, since hardware implementations of the mathematical division are rather computationally expensive, the preferred methods are the methods that utilize the approaches in which the division involves dividing by a denominator that is a power of two. For example, some of the methods may be able to take an advantage of the hardware configuration and utilize a binary-shift operation to dividing a number by another number that is a power of two. Such approaches can be inexpensively implemented in hardware.

In an embodiment, a NEWNORM-X and a NEWNORM-Y are computed by first determining the "n" in the power of two for the hardware-implemented division. The "n" may be determined as follows:

$$n = \text{round}(\log_2(\text{NORM-}X + \text{NORM-}Y))$$

wherein log 2 is the logarithm to the base of "2," and wherein "round" is a function that rounds a particular numerical value to the closest integer value.

In a particular implementation, in an embodiment, the "n" may be determined as follows:

$$n = \text{floor}(\log_2(181*(\text{NORM-}X + \text{NORM-}Y))) - 7$$

wherein log 2 is the logarithm to the base of "2," wherein floor the "floor" is a function that maps a particular real number to the largest integer not exceeding the particular real number, wherein $181 = \lfloor \sqrt{2} * 2^7 \rfloor$, and wherein the "n" computed using this equation yields exactly the same result as the "n" computed using the equation: $n = \text{round}(\log_2(\text{NORM-}X + \text{NORM-}Y))$, above.

The above approaches for computing the "n" has been derived after a number of experiments and after determining that the "n" obtained using the above approaches is useful in computing the new normalized value for the X-direction and the new normalized value for the Y-direction.

In an embodiment, the NEWNORM-X and the NEWNORM-Y are computed as flows:

$$\text{NEWNORM-}X = |2^n - \text{NORM-}Y + \text{NORM-}X|$$

$$\text{NEWNORM-}Y = |2^n - \text{NORM-}X + \text{NORM-}Y|,$$

wherein "n" is computed as described above, and wherein the NORM-X and the NORM-X are computed as described in reference to FIG. 11-12.

In an embodiment, the NEWNORM-X and NEWNORM-Y represent weights in the respective X and Y directions. A weight corresponds to a measure of the gradients in a particular direction. For example, if the NEWNORM-X is greater than the NEWNORM-Y, then one might suspect that the gradient changes in the X-direction for a particular partial image are more significant than the gradient changes in the Y-direction for the same particular partial image.

A weight represents a contribution of each gradient in each direction to the overall environment characteristics of a particular pixel, and represents an amount of signal level difference that the gradients produce.

Computing the contribution of each direction is especially important to derive a measure that would make it possible to differentiate flat areas from detail areas in an overall image because the gradients behave in one way along edges and in another way across edges. For example, the gradients along edges are not monotonic and naturally add noise to the measurement whereas, the gradients across edges are monotonic and thus should contribute more to the texture map.

In step 1314, the SUM-X, computed in step 1008 of FIG. 10 is retrieved, and the SUM-Y, computed in step 1014 of FIG. 10 is retrieved.

In step 1316, a NEWSUM-X is computed from the SUM-X and NEWNORM-X. There are many approaches for deriving the NEWSUM-X. In an embodiment, computation of the NEWSUM-X takes an advantage of the hardware-implemented ability to perform a division by a binary shifting.

Ideally, the NEWSUM-X may be computed as:

$$NEWSUM-X = \frac{SUM-X*NEWNORM-X}{NORMX+NORMY}$$

However, in an embodiment, the NEWSUM-X may be computed as follows:

$$NEWSUM-X = \text{round}\left(\frac{SUM-X*NEWNORM-X}{2^{n+1}}\right)$$

wherein "round" is a function that rounds a particular numerical value to the closest integer value.

The NEWSUM-X represents a weighted value of the sum of the gradient changes in the X-direction. For example, if the gradients in the X-direction for the particular partial image seems to be monotonic, and thus do not change much, then each change in gradient will be assigned a relatively small weight and thus, the gradient changes for the particular partial image will indicate an edge environment, rather than a detail environment, for which the gradient might be chaotic.

Similarly, in step 1318, in an embodiment, the NEWSUM-Y may be computed as follows:

$$NEWSUM-Y = \text{round}\left(\frac{SUM-Y*NEWNORM-Y}{2^{n+1}}\right)$$

wherein "round" is a function that rounds a particular numerical value to the closest integer value.

After the changes in signs are weighed according to the difference in signal level across them, they are "reversed" so that edges are given a higher value. In the steps described below, the directions are combined with the function: $x^2+y^2$. This function has two benefits; first, it combines the two directions in a radial manner, thus allows at least partial removal of the angular dependence between the sign changes. Second, because the $x^2+y^2$ function is a parabolic function, it allows stretching the higher values, which correspond to the values for the edges depicted in the partial image, and thus allows obtaining a better differentiation between the edge regions and the detail regions.

In step 1320, a SUMX and a SUMY are computed. Note that the SUMX is not the same as a SUM-X retrieved in step 1314, and that SUMY is not the same as a SUM-Y retrieved in step 1314. In computing the SUMX element, summed and weighted signed change values for the X-Gradient Signs Map are taken into consideration, while in computing the SUM-X, only the raw values in the X-Gradient Signs Map are considered. In computing the SUMY element, summed and weighted signed change values for the Y-Gradient Signs Map are taken into consideration, while in computing the SUM-Y, only the raw values in the Y-Gradient Signs Map are considered.

There are various approaches for computing the SUMX and SUMY elements. In an embodiment, SUMX and SUMY are computed as follows:

$$SUMX=CONST1-NEWSUM-X$$

$$SUMY=CONST2-NEWSUM-Y$$

wherein CONST1 and CONST2 are empirically selected constant values, which, in an embodiment, may be the same.

The purpose of computing SUMX and SUMY according to the above equations is to "reverse" the difference in signal level change across the X-direction and Y-direction, respectively, for a particular partial image.

In an embodiment, the signal levels are reversed so that the edges depicted in a particular partial image are given a higher value in the resulting Texture Image Map 190 than it would be if the levels were not reversed. Because the gradients for the edges in a given direction are rather monotonic, the gradient changes for the monotonic edges are relatively insignificant. However, for the purpose of capturing the environment characteristics in the Texture Image Map 190, the corresponding values for the Texture Image Map 190 should have the values increased.

By a corollary, in an embodiment, the signal levels for a flat area depicted in a particular partial image are given a lower value in the resulting Texture Image Map 190 than it would be if the levels were not reversed. Because the gradients for the flat areas are rather chaotic, the gradient changes for the chaotic flat areas are relatively high. However, by reversing the signal levels, for the flat areas depicted by the particular partial image, the Texture Image Map 190 should have the values decreased.

In an embodiment, some of the pixels in an overall image will not have corresponding characteristics values in the Texture Image Map. For example, if the partial images used to generate a filtered image and then to compute the Texture Image Map are 9×9 matrixes, then the pixels along the border of the overall image are not going to corresponding values in the Texture Image Map. Those pixels may remain unprocessed. Due to the fact that the number of such pixels is small and that they are most likely located at the border of the overall image, leaving those pixels unprocessed most likely does not cause any significant issues.

The width of a border of the pixels in an overall image that do not have associated values of the Texture Image Map is a function of the number of pixels in a partial image that are needed to generate one value for the Texture Image Map. If the partial image is an n-by-n image, then the central pixel is located in the (n/2) row and in the (n/2) column. For example, if the partial image is a 9×9 matrix, then the central pixel of the partial image is located in the fifth row and the fifth column. Thus, one value for the Texture Image Map is going to be computed for a pixel in the fifth row and the fifth column, but no value for the Texture Image Map is going to be computed for the pixels in the rows 1-4 and for the pixels in the columns 1-4. In particular, if the partial images are 9×9 matrixes, then the border of the overall image is four-pixel-wide, and the pixels along the border are not going to have associated texture characteristics in the Texture Image Map. If the partial images were 7×7 matrixes, then the border of the overall image is three-pixel-wide, and the pixels along the border are not going to have associated texture characteristics in the Texture Image Map.

In the description below, it is assumed that the Texture Image Map has a border for which texture values are not computed. Since the width of the border depends on the implementation, the coordinates of the elements of the Texture Image Map in the description are ignored.

In step 1322, a value for the Texture Image Map value is computed. For example, if the process is executed for the first partial image 250, as depicted in FIG. 2, then the first element of the Texture Image Map 190 is computed. If the process is executed for the second partial image 260, as depicted in FIG. 2, then the second element of the Texture Image Map 190 is computed, and so forth.

In an embodiment, as Texture-Image-Map Value$_{i,j}$ is computed as follows:

Texture-Image-Map Value$_{i,j}$=(SUM$X^2$+SUM$Y^2$)−CONSTANT, wherein CONSTANT is an empirically selected constant value, wherein "i" represents a row in the Texture Image Map 190, and "j" represents a column in the Texture Image Map 190.

In an embodiment, the CONSTANT is a value that could be adjusted to achieve sufficient differentiation between edge and detail with lower bit resolution. In one example, the CONSTANT has associated value of "2000."

The process illustrated in FIG. 13 is repeated for each partial image of the overall image 110. Using the process, the Texture Image Map eventually becomes completely filled with intensity values.

After each partial image is processed, the Texture Image Map contains all values for each central pixel of the respective partial images. Note that the Texture Image Map is smaller in size than the overall image 110. For example, if the overall image 110 was a 10×10 matrix, and each of the partial images was a 9×9 image, then only four particular partial image could be selected from the overall image 110, and thus, in this example, the Texture Image Map is a 2×2 matrix. According to another example, if the overall image 110 was an 11×11 matrix, and each of the partial images was a 9×9 image, then only nine particular partial images could be selected from the overall image 110, and thus, in this example, the Texture Image Map is a 3×3 matrix.

7.0 DEPLOYMENT CONSIDERATIONS

Figure 14:
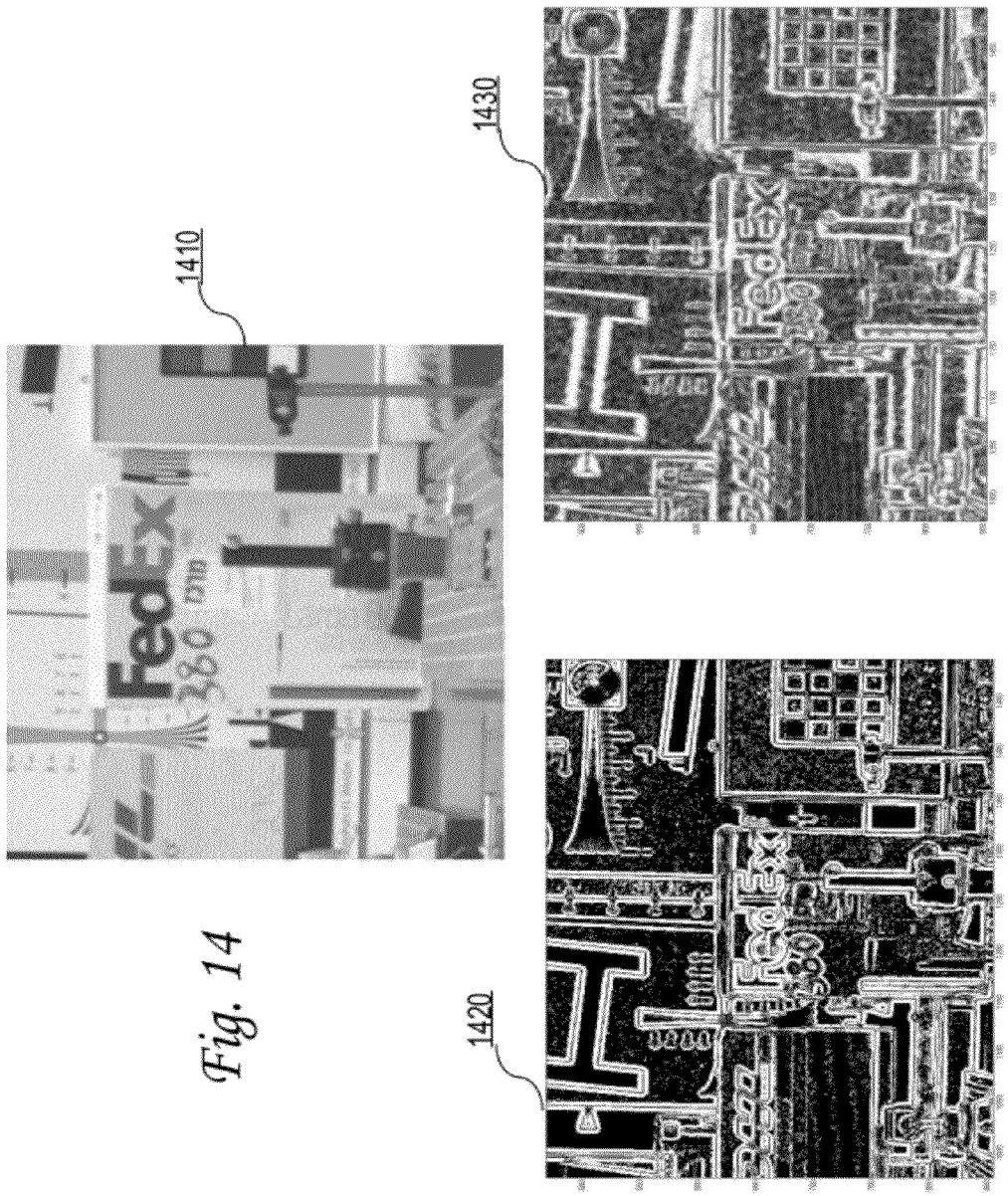
FIG. 14 depicts an example of an original image, an image processed using one of the known image sharpening techniques, and an image processed using a Texture Image.

FIG. 14 depicts an example of an original image 1410, an image processed using one of the known image sharpening techniques 1420, and an image processed using a Texture Image Map 1430. Distinguishing between edges and fine details is an important feature in the Optim1 algorithm developed by Tessera Technologies Ireland Ltd. The edge/detail information allows to adaptively control the amount of sharpening and color aberration correction based on the content of the image and a user's preference. Very often it is desired to reduce sharpening of the edges to avoid over sharpening of the edges in the resulting digital image, and to increase sharpening of the fine details to enhance the details in the detail areas in the resulting image.

Furthermore, the edge/detail information is useful in detecting gradients for the gradient improvement algorithm. The edge/detail information is stored in a Texture Image Map, described above. The Texture Image Map assigns a value to each pixel quantifying the texture of its environment on a flat-detail-edge scale. The Texture Image Map is used to correct the EDOF over-sharpening and the chromatic aberration distortions.

For example, the Texture Image Map allows sharpening the details in the detail environments and deemphasizes the edges in the edge environments of the resulting image.

In FIG. 14, an image 1410 represents an original overall image. The image 1410 has several flat areas, in which there are an insignificant number of details. The image 1410 has also several detail areas, in which there are many relatively small details, such as the fine print, text, etc. Moreover, the image 1410 has several areas that have some edges and some details, but are not just edge-environments and not just detail-environments.

An image 1420 in FIG. 14 depicts a resulting digital image generated using one of the known edge/detail methods, such as the "Reduce Strong Edges" algorithm (RSE). The image 1420 suffers from various defects. For example, the edge environments are exaggerated and the edges seem to be sharper than they are appearing in the original image 1410. For instance, the text "FedEx" appears rather sharp, while the details just below the "FedEx" text are almost indiscernible.

An image 1430 in FIG. 14 depicts a resulting digital image generated the approach based on the Texture Image Map described above. The image 1430 seems to have a better gray-shade resolution, the details are more discernable and the edges are more naturally looking than they appear in the image 1420. The color (gray scale) variety is larger and almost continuous in the image 1430 then in the image 1420. The noise reduction seems to be better in the image 1430 than in the image 1420.

8.0 GRADIENT AREAS

Although the edge-detail map described above is very helpful in determining, for example, sharpening adjustments for a digital image, the edge-detail map has some limitations. While the edge-detail map may be useful in distinguishing edge areas from detail areas and flat areas in the digital image, the edge-detail map may not be very helpful in determining the areas that depict, for example, shadows. Relying solely on the information stored in the edge-detail map may be insufficient in determining the shadow areas because the characteristics stored in the edge-detail map for the shadows may be similar to the characteristics stored in the edge-detail map for the edge areas or for the detail/flat areas.

To elaborate, shadows often appear in areas that are referred to herein as "gradient areas." A gradient area is an area of an image in which signal level changes are monotonic and slow. Because the signal level changes are monotonic, gradient areas are similar to edges in the edge/detail map. However, unlike edges, the signal level changes in a gradient area are slow, not large and sudden. This gradual signal change characteristic is similar to that of a flat region and sometimes it is needed to differentiate between the gradient and the edge based on this characteristic.

In many situations, it is important to identify gradient areas because it may be desirable to treat these areas differently from flat, detail or edge regions. For example, it may be desirable to control the sharpening of a gradient area differently from an edge, detail or flat region to prevent the sharpening of noise in the gradient area. To enable gradient areas to be identified, one embodiment of the present invention provides a technique for calculating a gradient improvement metric, which provides an indication of whether an area of an image is a gradient area. One embodiment of the technique is described below.

9.0 GRADIENT IMPROVEMENT METRIC

In an embodiment, gradient (i.e., monotonic and smooth) areas of a digital image are defined as regions in which pixel values change monotonically and relatively slowly. Pixel values may also be referred to as signal levels since the pixel values are determined based on the signal level's readings performed by sensors.

Gradient regions appear primarily in the areas depicting shadows. One of the characteristics of the areas depicting shadows is that the shadows appear as being smoothly brushed. For example, a color intensity of the shadow in a shadow area should smoothly and gradually dissipate in an image. To maintain the shadow effect in the image, the gradient region depicting the shadow may rarely require sharpening.

One of the properties of the gradient regions is the fact that regardless of whether the gradient regions represent shadows or noise signals, the objects depicted in the gradient regions should appear as being smoothly brushed and that the objects require none or very little sharpening. To achieve that effect, processing of the gradient regions should include very little sharpening, or in some instances, no sharpening at all. Sharpening of the appearance of the shadows and sharpening of the appearance of the noise in a digital image is often undesirable because neither the shadows nor the noise regions should be amplified.

In an embodiment, an approach to processing gradient areas is provided. The approach is based on observing that the gradient areas require a special recognition and that an independent control in terms of image sharpening may be required for the gradient regions.

In an embodiment, a gradient improvement (GI) metric is used to quantify the "gradient property" of the regions in a digital image.

Values generated for a GI metric and stored in the GI metric may be interpreted in many ways. In one embodiment, the higher the values in the GI metric for a particular area of the digital image, the more gradient (monotonic) the particular area is, and hence, the pixel values for the pixels that belong to the particular area may require less sharpening than otherwise would have been required if the area was not gradient (monotonic).

In embodiment, determining a GI metric is a two-part process. In the first part, a distinction is made between edge-area characteristics and gradient-area characteristics for a particular region based on the rate of change of the signal level in the region. The more constant rate of change is, the more the region is a gradient region. The less constant rate of change is (i.e., if the maximum difference between signal levels in the region is much larger than the minimum difference between signal levels in the region), the closer the region is to an edge region.

In the second part, a determination is made whether the particular area is a detail area or a gradient area based on information stored in the edge/detail metric, described above.

In an embodiment, the two parts described above are combined to determine a Gradient Improvement (GI) metric. For example, the results determined in the first part may be multiplied by the values stored in the edge/detail metric for the corresponding region, and the results may be stored in a table referred to as the GI metric.

In an embodiment, the first part of the GI algorithm uses configurable parameters to distinguish between an edge area and a detail area for a particular region of the digital image.

Figure 19:
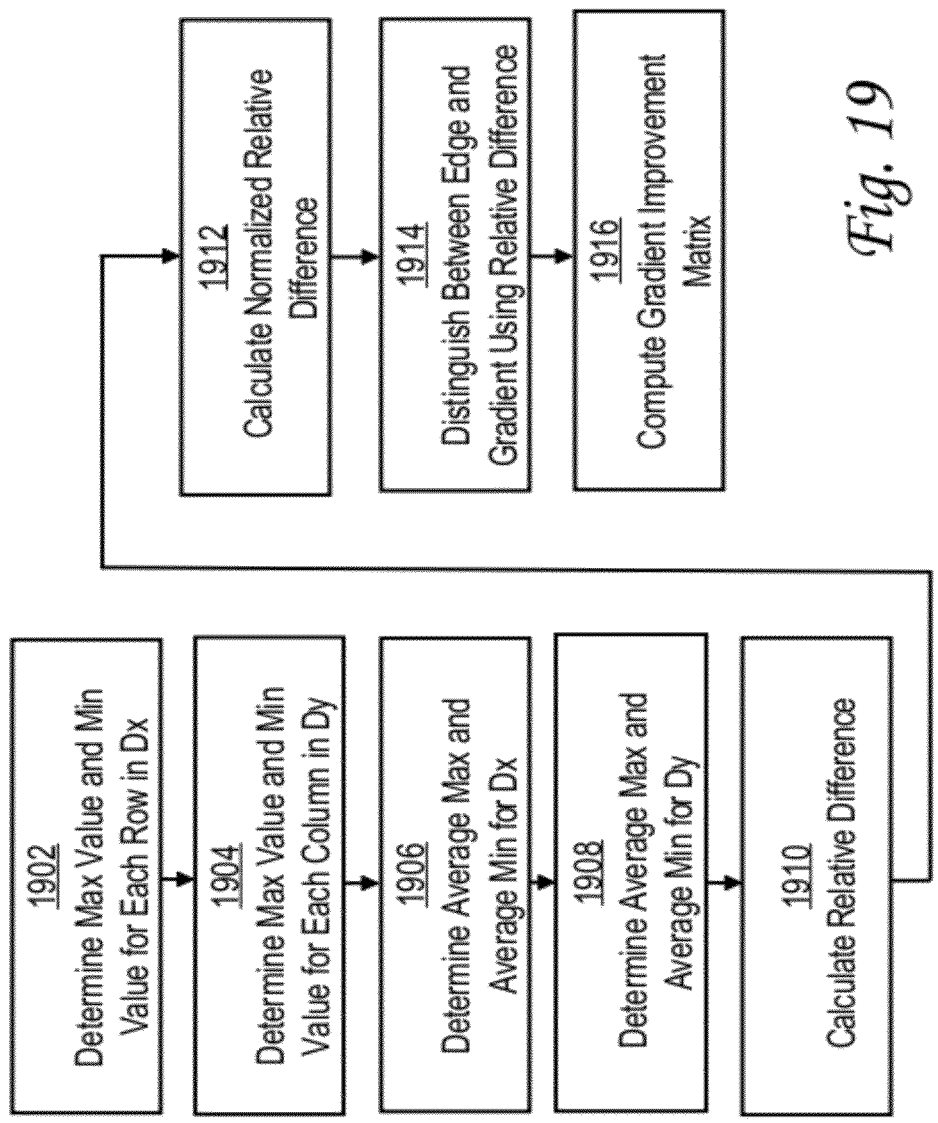
FIG. 19 depicts an example of technique for determining a gradient improvement metric.

FIG. 19 depicts an example of technique for determining a gradient improvement (GI) metric. In the description, it is assumed that steps 1002-1014 of FIG. 10 (described above) have been completed, and an X-Gradient Map 140 and a Y-Gradient Map 160 of FIG. 1 have been computed. In the description below, merely for simplicity, X-Gradient Map 140 of FIG. 1 is referred to as a Dx metric, while Y-Gradient Map 160 of FIG. 1 is referred to as a Dy.

In step 1902, maximum values and minimum values are determined for each row of Dx metric. Dx metric corresponds to X-Gradient Map 140 of FIG. 1, and the steps involved in computing X-Gradient Map 140 were described in detail in reference to FIG. 6-7.

In an embodiment, for each row of Dx metric, a maximum value of all values stored in the given row is determined. The maximum value for the given row may be stored along with an associated row index or a row pointer. The process of determining a maximum value for a given row is repeated for each row of the Dx metric.

In an embodiment, for each row of Dx metric, a minimum value of all values stored in the given row is determined. The minimum value for the given row may be stored along with an associated row index or a row pointer. The process of determining a minimum value for a given row is repeated for each row of the Dx metric.

In step 1904, maximum values and minimum values are determined for each column of Dy metric. Dy metric corresponds to Y-Gradient Map 160 of FIG. 1, and the steps involved in computing the Y-Gradient Map 160 were described in detail in reference to FIG. 8.

In an embodiment, for each column of Dy metric, a maximum value of all values stored in the given column is determined. The maximum value for the given column may be stored along with an associated column index or a column pointer. The process of determining a maximum value for a given column is repeated for each column of the Dy metric.

In an embodiment, for each column of Dy metric, a minimum value of all values stored in the given column is determined. The minimum value for the given column may be stored along with an associated column index or a column pointer. The process of determining a minimum value for a given column is repeated for each column of the Dy metric.

In step 1906, an average maximum value and average minimum value from the respective maximum values and the respective minimum values for Dx metric are computed.

In an embodiment, an average maximum value for Dx metric is determined by computing a sum of all maximum values determined for Dx in step 1902 and dividing the sum by a constant value. The constant value may be selected based on empirical data. In one embodiment, the constant is referred to as "$2^{max\_min\_reduce}$" and has assigned value of "1."

In an embodiment, an average maximum value is computed using the following equation:

$$maxDx = (\Sigma \text{ maximum values computed for all rows of } Dx)/(2^{max\_min\_reduce}).$$

In an embodiment, an average minimum value for Dx metric is determined by computing a sum of all minimum values determined for Dx in step 1902 and dividing the sum by a constant value. The constant value may be selected based on empirical data. In one embodiment, the constant is referred to as "$2^{max\_min\_reduce}$" and has an assigned value of "1."

In an embodiment, an average minimum value is computed using the following equation:

$$minDx = (\Sigma \text{ minimum values computed for all rows of } Dx)/(2^{max\_min\_reduce}).$$

In step 1908, an average maximum value and average minimum value from the respective maximum values and the respective minimum values for Dy metric are computed.

In an embodiment, an average maximum value for Dy metric is determined by computing a sum of all maximum values determined for Dy in step 1904 and dividing the sum by a constant value. The constant value may be selected based on empirical data as above, and may be referred to as "$2^{max\_min\_reduce}$" with an assigned value of "1."

In an embodiment, an average maximum value is computed using the following equation:

$$maxDy = (\Sigma \text{ maximum values computed for all columns of } Dy)/(2^{max\_min\_reduce}).$$

In an embodiment, an average minimum value for Dy metric is determined by computing a sum of all minimum values determined for Dy in step 1904 and dividing the sum by a constant value. The constant may be referred to as "$2^{max\_min\_reduce}$" with an assigned value of "1."

In an embodiment, an average minimum value is computed using the following equation:

$$minDy = (\Sigma \text{ minimum values computed for all columns of } Dy)/(2^{max\_min\_reduce}).$$

In step 1910, a relative difference value is computed. In an embodiment, the relative difference value is computed based on the average maximum values and average minimum values determined in steps 1906-1908, described above.

In an embodiment, a difference between the average maximum value for Dx and the average minimum value for Dx is computed and referred to as "rdx." The rdx may be computed using the following equation:

$$rdx = maxDx - minDx.$$

In an embodiment, a difference between the average maximum value for Dy and the average minimum value for Dy is computed and referred to as "rdy." The rdy may be computed using the following equation:

$$rdy = maxDy - minDy.$$

In an embodiment, a relative difference value ("rd") is computed based on rdx and rdy. For example, the rd may be determined as the maximum value of rdx and rdy. In an embodiment, the rd may be computed using the following equation:

$$rd = MAX(rdx, rdy).$$

In step 1912, a normalized relative difference is calculated from a relative difference computed in step 1910. Normalization of the relative difference value may be performed using a variety of approaches. For example, the normalization may be performed based on the signal level, and/or based on a non-linear transformation (NLT) and utilizes a look-up table (LUT).

A non-linear transformation (NLT) may be used to remove signal dependency of data stored in various metrics, such as information metric and a gradient-improvement metric. Due to the nature of some calculations required to generate the information metric and/or the gradient-improvement metric, a signal level normalization may be required to normalize the scaling of the signal level.

Value normalization should be performed by dividing the value by the signal level or an approximation of it. However, merely dividing the value by the signal level has several disadvantages. For example, using a divider is expensive in terms of hardware gate count ("GC"). Furthermore, at very low signal levels, the normalization may cause noise because of the high slope of 1/(signal) at the region. Moreover, simply dividing may not allow enough freedom for configuring the image sampling and processing system.

Another approach to value normalization utilizes a look-up-table (LUT) approach. The LUT approach may be preferred over a simple value division. The LUT may be designed so that the signal level is used to obtain the proper normalization of the 'information' value. The value obtained from the LUT may be used to multiply the 'information' value. The LUT may implement a non-linear function which resembles the function $x^{-1}$. Empirical data shows that using a function $x^n$ in which "n" about equal to "−0.8" is preferred over using "n" equal to "−1."

In an embodiment, using a LUT approach enables modifying the function values to allow more or less amplification of detail and noise at low or high signal levels, without adhering to any particular analytical function.

In an embodiment, a look-up-table (LUT) contains 18 fixed bins. The non-linear transformation (NLT) may be sampled at the 19 values. Between the samples, a linear interpolation is used. Therefore, the input of the LUT may represent the signal level and the output may represent a linear piecewise function based on the NLT function. The slope $a_0$, for example, may be calculated using a slope function=$(y_1-y_0)/(x_1-x_0)$. The bins may be chosen so that $(x_1-x_0)$ is a power of two so that the division can be performed using a simple shift operation, implemented in hardware.

In an embodiment, a normalized relative difference is calculated using a NLT LUT approach, in which the normalized relative difference is calculated using the rd value computed in step 1910 above, and using for example, an output of the NLT LUT.

In an embodiment, a normalized relative difference is computed and referred to as "rd_div_y." The rd_div_y may be computed using the following equation:

$$rd\_div\_y = (rd * \text{gamma\_derivative})/(2^{rd\_reduce});$$

wherein "gamma derivative" is a constant value representing an image correction factor for controlling overall brightness of an image, and rd_reduce is a scaling factor for "rd_div_y."

In step 1914, user-defined parameters are used to distinguish between an edge area and a gradient area in a particular region. In an embodiment, a temporary value ("tmp") is computed from user defined constants rd_slope, rd_div_y and rd_co_low. The tmp may be computed as follows:

$$tmp = rd\_slope \times (rd\_div\_y - rd\_co\_low)$$

The value of tmp is saturated to $2^{\wedge}rd\_final\_res - 1$:

$$tmp = \begin{cases} tmp, & \text{for } tmp < 2^{\wedge}rd\_final\_res - 1; \\ 2^{\wedge}rd\_final\_res - 1, & \text{for } tmp > 2^{\wedge}rd\_final\_res - 1; \end{cases}$$

wherein rd_final_res is a constant value that represents the final resolution of rd. In one implementation, rd_final_res has assigned value of "7."

In an embodiment, a distinction is made between an edge and a gradient for a particular region. In an embodiment, tmp is used to determine a final relative difference, "$rd_{final}$" that allows distinguishing between an edge and a gradient in the particular region.

In an embodiment, the $rd_{final}$ is computed using the following equation:

$$rd_{final} = \begin{cases} 2^{\wedge}rd\_final\_res - 1, & \text{for } rd\_div\_y < rd\_co\_low; \\ 2^{\wedge}rd\_final\_res - tmp, & \text{for } rd\_co\_low < rd\_div\_y; \end{cases}$$

The above equation may be interpreted as follows: if the "rd_div_y" is less than rd_co_low, computed above, then $rd_{final}$ for a given pixel in a particular area has a relatively large value ($2^{rd\_final\_res}$), and thus indicates a gradient area, such as a shadow. Hence, if a particular area contains the pixels for which rd_div_y is equal to or lesser than rd_co_low, then the particular area is most likely a gradient area. However, if a particular area contains the pixels for which rd_div_y is greater than rd_co_low, then the particular area is either an edge area or an area that is partially a gradient area and partially an edge area. The above correlation may be illustrated in a graph, such as one depicted in FIG. 20.

FIG. 20 depicts correlation between a gradient-difference-final-value and an edge-gradient indicator. In FIG. 20, a horizontal axis 2002 represents a "rd_div_y" axis. The "rd_div_y" axis represents a mapping of normalized relative difference values that were computed for a particular area using any normalization technique, such as for example a NLT LUT described above. A vertical axis 2004 represents a "rd_final" axis. The "rd_final" axis represents a mapping of relative difference final values that were computed using normalized relative difference values ("rd_div_y") and some constants, as described above.

+

A relationship between normalized relative difference values ("rd_div_y") and relative difference final values ("rd_final") may be represented as a slope function that comprises three segments, a first segment 2010, a second segment 2012 and a third segment 2014.

In an embodiment, the first segment 2010 represents a relationship between normalized relative difference values ("rd_div_y") and relative difference final values ("rd_final") when rd_div_y is smaller than a constant value "rd_co_low" described above. For example, if "rd_div_y" is equal or lesser than rd_co_low (as depicted in FIG. 20 as point 2040), then the corresponding rd_final values are constant (as depicted in FIG. 20 at point 2020). Such values of "rd_final" for the predetermined values of the constants described above, most likely indicate that a corresponding region contains gradients, not edges. Hence, the pixels that have such characteristics, i.e., that the computed "rd_final" for the predetermined values of the constants described above and for "rd_div_y" not exceeding "rd_co_low," are most likely the pixels that belong to the corresponding gradient area, not an edge area. Such pixels may require no sharpening or very little sharpening relatively to the amount of sharpening required for the pixels that belong to an edge area.

In an embodiment, the second segment 2012 represents a relationship between normalized relative difference values ("rd_div_y") and relative difference final values ("rd_final") when rd_div_y is larger than a constant value "rd_co_low" described above. For example, if "rd_div_y" is larger than rd_co_low (as depicted in FIG. 20 as point 2040), then the corresponding rd_final values most likely get smaller as the values of "rd_div_y" increase (as depicted in FIG. 20 as a slope 2012). Such values of "rd_final" for the predetermined values of the constants described above, most likely indicate that a corresponding region is an intermediate between gradient and an edge. Hence, the pixels that have such characteristics, i.e., that the computed "rd_final" for the predetermined values of the constants described above and for "rd_div_y" exceeding "rd_co_low," are most likely the pixels that belong to the corresponding are that contains gradients and edges. Such pixels may require intermediate sharpening because the pixels of that area may not require as much sharpening as the pixels that belong to an edge would require and because the pixels of that area may require more sharpening than the pixels that belong to a gradient area.

In an embodiment, the third segment 2014 represents a relationship between normalized relative difference values ("rd_div_y") and relative difference final values ("rd_final") when rd_div_y is not only larger than a constant value "rd_co_low" described above, but also larger than some threshold value 2050. For example, if "rd_div_y" is larger than a constant value 2050, then the corresponding rd_final values are constant (as depicted in FIG. 20 at point 2030). Such values of "rd_final" for the predetermined values of the constants described above, most likely indicate that a corresponding region contains edges, not gradients. Hence, the pixels that have such characteristics, i.e., that the computed "rd_final" for the predetermined values of the constants described above and for "rd_div_y" exceeding the constant value depicted in FIG. 20 as point 2050, are most likely the pixels that belong to the corresponding edge area, not a gradient area. Such pixels may require some sharpening and the amount of the applicable sharpening may be larger than the amount of sharpening that is required for the pixels that belong to a gradient area.

Referring again to FIG. 19, in step 1918, a gradient processor determines a gradient improvement matrix (GI_mat). In an embodiment, the GI_mat may be determined by multiplying the rd_final value for a particular pixel of the partial image by a corresponding value stored in the edge/detail map, computation of which was described in reference to FIG. 10-13.

$$GI\_mat = rd\_final \times ed\_mat$$

wherein "rd_final" is a final relative difference, computed as described above, and "ed_mat" is the edge/detail map, computed as described in reference to FIG. 10-13.

In an embodiment, after each partial image (each region) of a digital image is processed, the GI_mat contains all values for each central pixel of the respective partial images. Note that the GI_mat may be smaller in size than the overall image 110. For example, if the overall image 110 was a 10×10 matrix, and each of the partial images was a 9×9 image, then only four particular partial image could be selected from the overall image 110, and thus, in this example, the GI_mat is a 2×2 matrix. According to another example, if the overall image 110 was an 1 1×11 matrix and each of the partial images was a 9×9 image, then only nine particular partial images could be selected from the overall image 110, and thus, in this example, the GI_mat is a 3×3 matrix.

In an embodiment, a GI_mat contains information useful to differentiate the amount of sharpening for a digital image based on indications of the type of textural environment of the regions of the digital image and the gradient characteristics of the regions.

In an embodiment, the amount of sharpening required for regions of a digital image is determined based on values stored in a GI_mat for the corresponding pixels. For example, high values stored in the GI_mat indicate that the corresponding pixels belong to gradient areas, in which the gradients are rather monotonic and for which there is a relatively constant change in gradient values. On the other hand, low values stored in the GI_mat indicate that the corresponding pixels belong to the areas depicting details or edges because for such areas an ed-mat, used in computing the GI_mat) most likely stored relatively small values, or that the corresponding pixels belong to the areas depicting edges because for such areas rd_final values, used in computing the GI_mat) most likely have small values, as depicted in FIG. 20.

11.0 IMPLEMENTATION MECHANISMS—HARDWARE OVERVIEW

According to one embodiment, the techniques described herein are implemented by one or more special-purpose computing devices. The special-purpose computing devices can be incorporated into a digital image acquisition device, such as a digital camera, or might be separate from such a digital image acquisition device.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 15 is a block diagram that illustrates a computer system 1500 upon which an embodiment of the invention may be implemented. Computer system 1500 includes a bus 1502 or other communication mechanism for communicating information, and a hardware processor 1504 coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

Various forms of machine-readable storage media may be involved in carrying one or more sequences of one or more instructions to processor 1504 for execution. For example, the instructions may initially be carried on a magnetic disk of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1510. Volatile media includes dynamic memory, such as main memory 1506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

The apparatus 180 of FIG. 1 may be incorporated into a variety of devices to enable those devices to have image capturing and processing capability. These devices may include, for example, mobile communication devices (e.g. cellular phones, smart phones, etc.), personal digital assistants, audio/video capture devices (e.g. cameras, video recorders, etc.), as well as a myriad of other devices. An example of a mobile communication device in which the apparatus 180 of FIG. 1 may be part of the mobile communication device depicted in FIG. 17.

Figure 17:
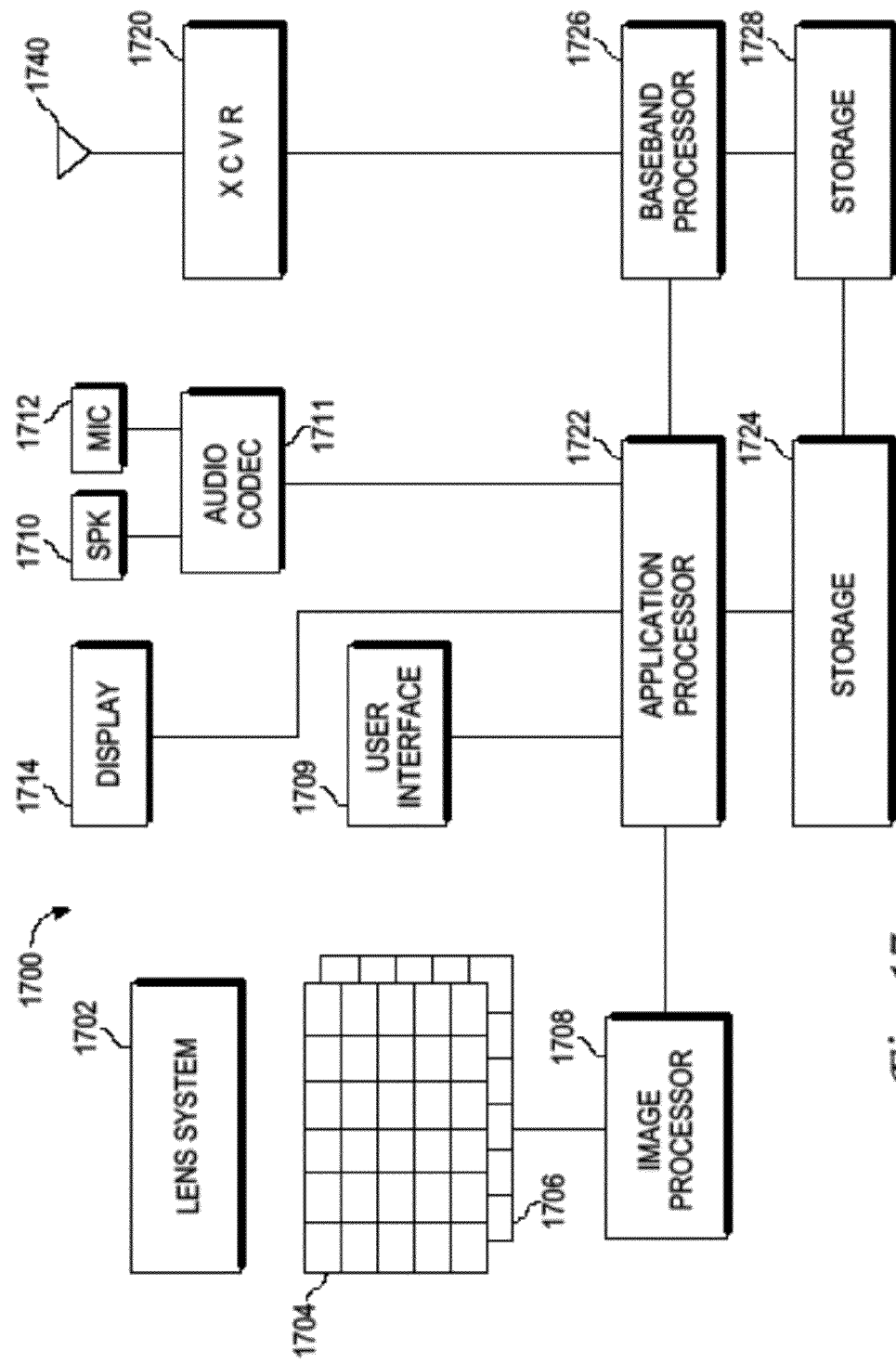
FIG. 17 depicts a block diagram of a sample mobile communication device in which one embodiment of the present invention may be implemented.

FIG. 17 is a block diagram of a sample mobile communication device 1700 in which one embodiment of the present invention may be implemented. The mobile communication device 1700 comprises a lens system 1702, a color filter array (CFA) 1704, an optical sensor array 1706 and an image processor 1708. The lens system 1702 receives light from an image to be captured and focuses the light onto the CFA 1704. For purposes of the present invention, the lens system 1702 may be a simple lens system consisting of just one lens, or it may comprise multiple lenses that work in conjunction with each other. The lens system 1702 may be made of any type of suitable lens material, including but not limited to glass and plastic.

In one embodiment, the CFA 1704 takes the form of a Bayer pattern filter; however, this is not required. For purposes of the present invention, the CFA 1704 may be any type of color filter array that uses any set of color filters arranged in any desired pattern.

In one embodiment, the optical sensor array 1706 comprises a plurality of optical sensor elements arranged in rows and columns that correspond to the rows and columns of filter elements of the CFA 1704.

The sensed color values provided by the optical sensor array 1706 are received by the image processor 1708. Since only one color value is provided by the sensor array 1706 for each pixel, the image processor 1708 calculates the other color values that need to be calculated for each pixel.

For purposes of the present invention, the image processor 1708 may be implemented using any known technology. For example, the image processor 1708 may be hardware implemented using a device (e.g. a programmable logic array) having an array of logical elements wherein the logical elements are programmed/configured to implement the technique described herein. As an alternative, the image processor 1708 may be hardware implemented by way of another device such as an application specific integrated circuit (ASIC) having logical elements that are constructed/configured to implement the technique described herein. As a further alternative, the image processor 1708 may be software implemented such that the technique described herein is set forth in a set of instructions which are stored in a machine readable storage medium and executed by one or more computing devices to carry out the technique described herein. These and other implementations are possible. All possible implementations are within the scope of the present invention.

In an embodiment, the image processor 1708 implements the functionalities of the apparatus 180 of FIG. 1. In another embodiment, the functionalities of the apparatus 180 of FIG. 1 are implemented in an application processor 1722.

The application processor 1722 is coupled to various other components, including storage 1724, user interface 1709, display 1714, and audio codec 1711. In one embodiment, it is the application processor 1722 that provides most of the non-wireless communication functionality of the device 1700. In performing its functions, the application processor 1722 executes one or more programs (not shown) stored in storage 1724. These programs may include an operating system, which is executed by application processor 1722 to provide the basic functions required by the hardware and software components of the device 1700. These programs may further include other programs (e.g. games, tools, social networking programs, utilities, navigation programs, browsing programs, etc.) that enable the application processor 1722 to provide additional functionality. Storage 1724 may store any type of program to enable the application processor 1722 to provide any type of functionality. In addition to storing programs, the storage 1724 may also be used by the application processor 1722 to store temporary information/data that is used by the application processor 1722 during program execution.

During operation, the application processor 1722 interacts with the user interface 1709 to receive input from a user. The user interface 1709 may include, for example, a touch sensitive screen, a cursor control device, a keyboard/keypad (physical or virtual), and various other devices that allow the user to provide input. To provide visual output to the user, the application processor 1722 is coupled to the display 1714. Display 1714 may be an LCD screen, an LED screen, or any other type of display that allows the user to view visual output in the form of text, web pages, video, etc.

The application processor 1722 is also coupled to the audio codec 1711 to enable the user to provide audio input to the device 1700 and to enable the application processor to provide audio output to the user. The audio codec 1711 receives analog audio input from the user through microphone 1712 and transforms the analog audio input into digital audio signals that can be processed by the application processor 1722. In addition, the codec receives digital audio signals from the application processor 1722 and transforms them into analog audio signals that can be played by the speaker 1710 to the user.

The application processor 1722 may further be coupled to a baseband processor 1726, which in turn is coupled to a second storage 1728 and a transceiver 1720. In an embodiment, the baseband processor 1726 is responsible for performing most of the wireless communication functions of the mobile communication device 1700, including the functionalities of the apparatus 180 of FIG. 1. In doing so, the baseband processor 1726 executes one or more programs (not shown) stored in the second storage 1728. These programs may include an operating system (which may be the same or different operating system as that executed by the application processor 1722), programs for processing incoming communication signals, program for processing outgoing communication signals, and various other programs. In addition to storing programs, the storage 1728 may also be used by the baseband processor 1726 to store temporary information/data that is used by the baseband processor 1726 during program execution.

In processing wireless communication signals, the baseband processor 1726 interacts with the transceiver 1720. The transceiver 1720 receives incoming wireless communication signals through antenna 1740 and transforms them into digital signals that can be processed by the baseband processor 1726. In addition, the transceiver 1720 receives digital signals from the baseband processor 1726 and transforms them into signals that can be sent out wirelessly through antenna 1740.

In wireless communication device 1700, the application processor 1722 acts as the central interface for integrating the image processor 1708 and the baseband processor 1726 with the other components in the device 1700. For example, the application processor 1722 receives the image information processed by the image processor 1708 and allows it to be displayed on display 1714. The application processor 1722 also allows the image information to be stored in storage 1724. In addition, the application processor 1722 receives digital communication signals from the baseband processor 1726 and allows it to be sent to the speaker 1710 to be played to the user. Furthermore, the application processor 1722 allows audio input provided by the user through microphone 1712 to be sent to the baseband processor 1726 for further processing and subsequent transmission.

12.0 EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A device comprising a plurality of elements, including logical elements, wherein the elements are configured to perform the operations of:
   in a neighborhood of pixels surrounding and including a particular pixel, applying a filter to multiple groups of pixels in the neighborhood to generate a set of filtered values;
   generating, based at least in part upon the set of filtered values, two or more sets of gradient values, wherein each set of gradient values reflects changes in the set of filtered values in a particular direction;
   based at least in part upon the two or more sets of gradient values, computing a first metric for an image environment in which the particular pixel is situated, wherein the first metric distinguishes between an edge environment, in which changes in filtered values are steep, and a gradient environment, in which changes in filtered values are gradual;
   based at least in part upon the two or more sets of gradient values, determining a second metric for the image environment in which the particular pixel is situated, wherein the second metric distinguishes between a detail environment, in which changes in gradient values are chaotic, and a gradient environment, in which changes in gradient values are monotonic;
   wherein changes in gradient values are chaotic if there is a large number of directional changes in the gradient values; and
   wherein changes in gradient values are monotonic if there is a small number of directional changes in the gradient values; and
   based at least in part upon the first metric and the second metric, computing a gradient improvement (GI) metric for the particular pixel, wherein the GI metric indicates whether the particular pixel is situated in a gradient environment in which changes in filtered values are gradual and changes in gradient values are monotonic.

2. The device of claim 1, wherein computing the first metric comprises:
   based at least in part upon the two or more sets of gradient values, computing an overall maximum difference value, which represents a difference between a maximum gradient value and a minimum gradient value;
   normalizing the overall maximum difference value by a signal level value to derive a normalized difference value; and
   based at least in part upon the normalized difference value, deriving the first metric.

3. The device of claim 1, wherein generating two or more sets of gradient values comprises:
   generating a first set of gradient values reflecting changes in the set of filtered values in a first direction; and
   generating a second set of gradient values reflecting changes in the set of filtered values in a second and different direction.

4. The device of claim 3, wherein computing the first metric comprises:
   based at least in part upon the first set of gradient values, determining a first minimum gradient value and a first maximum gradient value;
   based at least in part upon the second set of gradient values, determining a second minimum gradient value and a second maximum gradient value; and
   based at least in part upon the first minimum gradient value, the first maximum gradient value, the second minimum gradient value, and the second maximum gradient value, determining an overall maximum difference value.

5. The device of claim 4, wherein:
determining the first minimum gradient value and the first maximum gradient value comprises:
obtaining from the first set of gradient values a first plurality of minimum gradient values;
based at least in part upon the first plurality of minimum gradient values, computing the first minimum gradient value;
obtaining from the first set of gradient values a first plurality of maximum gradient values; and
based at least in part upon the first plurality of maximum gradient values, computing the first maximum gradient value; and
determining the second minimum gradient value and the second maximum gradient value comprises:
obtaining from the second set of gradient values a second plurality of minimum gradient values;
based at least in part upon the second plurality of minimum gradient values, computing the second minimum gradient value;
obtaining from the second set of gradient values a second plurality of maximum gradient values; and
based at least in part upon the second plurality of maximum gradient values, computing the second maximum gradient value.

6. The device of claim 4, wherein determining the overall maximum difference value comprises:
based at least in part upon the first minimum gradient value and the first maximum gradient value, determining a first maximum difference value for the first direction;
based at least in part upon the second minimum gradient value and the second maximum gradient value, determining a second maximum difference value for the second direction; and
selecting the greater of the first maximum difference value and the second maximum difference value to be the overall maximum difference value.

7. The device of claim 4, wherein computing the first metric further comprises:
normalizing the overall maximum difference value by a signal level value to derive a normalized difference value; and
based at least in part upon the normalized difference value, deriving the first metric.

8. A device comprising a plurality of elements, including logical elements, wherein the elements are configured to perform the operations of:
in a neighborhood of pixels surrounding and including a particular pixel, applying a filter to multiple groups of pixels in the neighborhood to generate a set of filtered values;
generating, based at least in part upon the set of filtered values, one or more sets of gradient values, wherein each set of gradient values reflects changes in the set of filtered values in a particular direction;
based at least in part upon the one or more sets of gradient values, computing a first metric for an image environment in which the particular pixel is situated, wherein the first metric distinguishes between an edge environment, in which changes in filtered values are steep, and a gradient environment, in which changes in filtered values are gradual;
based at least in part upon the one or more sets of gradient values, determining a second metric for the image environment in which the particular pixel is situated, wherein the second metric distinguishes between a detail environment, in which changes in gradient values are chaotic, and a gradient environment, in which changes in gradient values are monotonic;
based at least in part upon the first metric and the second metric, computing a gradient improvement (GI) metric for the particular pixel, wherein the GI metric indicates whether the particular pixel is situated in a gradient environment in which changes in filtered values are gradual and changes in gradient values are monotonic; and
wherein computing the GI metric comprises: multiplying the first metric by the second metric to derive the GI metric.

9. A method comprising:
in a neighborhood of pixels surrounding and including a particular pixel, applying a filter to multiple groups of pixels in the neighborhood to generate a set of filtered values;
generating, based at least in part upon the set of filtered values, two or more sets of gradient values, wherein each set of gradient values reflects changes in the set of filtered values in a particular direction;
based at least in part upon the two or more sets of gradient values, computing a first metric for an image environment in which the particular pixel is situated, wherein the first metric distinguishes between an edge environment, in which changes in filtered values are steep, and a gradient environment, in which changes in filtered values are gradual;
based at least in part upon the two or more sets of gradient values, determining a second metric for the image environment in which the particular pixel is situated, wherein the second metric distinguishes between a detail environment, in which changes in gradient values are chaotic, and a gradient environment, in which changes in gradient values are monotonic;
wherein changes in gradient values are chaotic if there is a large number of directional changes in the gradient values; and
wherein changes in gradient values are monotonic if there is a small number of directional changes in the gradient values; and
based at least in part upon the first metric and the second metric, computing a gradient improvement (GI) metric for the particular pixel, wherein the GI metric indicates whether the particular pixel is situated in a gradient environment in which changes in filtered values are gradual and changes in gradient values are monotonic;
wherein the method is performed by one or more computing devices.

10. The method of claim 9, further comprising:
based at least in part upon the two or more sets of gradient values, computing an overall maximum difference value, which represents a difference between a maximum gradient value and a minimum gradient value;
normalizing the overall maximum difference value by a signal level value to derive a normalized difference value; and
based at least in part upon the normalized difference value, deriving the first metric.

11. The method of claim 9, wherein generating two or more sets of gradient values comprises:
generating a first set of gradient values reflecting changes in the set of filtered values in a first direction; and
generating a second set of gradient values reflecting changes in the set of filtered values in a second and different direction.

12. The method of claim 11, wherein computing the first metric comprises:
- based at least in part upon the first set of gradient values, determining a first minimum gradient value and a first maximum gradient value;
- based at least in part upon the second set of gradient values, determining a second minimum gradient value and a second maximum gradient value; and
- based at least in part upon the first minimum gradient value, the first maximum gradient value, the second minimum gradient value, and the second maximum gradient value, determining an overall maximum difference value.

13. The method of claim 12, wherein:
- determining the first minimum gradient value and the first maximum gradient value comprises:
  - obtaining from the first set of gradient values a first plurality of minimum gradient values;
  - based at least in part upon the first plurality of minimum gradient values, computing the first minimum gradient value;
  - obtaining from the first set of gradient values a first plurality of maximum gradient values; and
  - based at least in part upon the first plurality of maximum gradient values, computing the first maximum gradient value; and
- determining the second minimum gradient value and the second maximum gradient value comprises:
  - obtaining from the second set of gradient values a second plurality of minimum gradient values;
  - based at least in part upon the second plurality of minimum gradient values, computing the second minimum gradient value;
  - obtaining from the second set of gradient values a second plurality of maximum gradient values; and
  - based at least in part upon the second plurality of maximum gradient values, computing the second maximum gradient value.

14. The method of claim 12, wherein determining the overall maximum difference value comprises:
- based at least in part upon the first minimum gradient value and the first maximum gradient value, determining a first maximum difference value for the first direction;
- based at least in part upon the second minimum gradient value and the second maximum gradient value, determining a second maximum difference value for the second direction; and
- selecting the greater of the first maximum difference value and the second maximum difference value to be the overall maximum difference value.

15. The method of claim 12, wherein computing the first metric further comprises:
- normalizing the overall maximum difference value by a signal level value to derive a normalized difference value; and
- based at least in part upon the normalized difference value, deriving the first metric.

16. The method of claim 12,
wherein computing the GI metric comprises: multiplying the first metric by the second metric to derive the GI metric.

* * * * *